United States Patent
Seshadri et al.

(10) Patent No.: US 10,453,063 B2
(45) Date of Patent: Oct. 22, 2019

(54) METHOD AND CORRESPONDING PROXY SERVER, SYSTEM, COMPUTER-READABLE STORAGE MEDIUM AND COMPUTER PROGRAM

(71) Applicant: Mastercard Asia Pacific Pte. Ltd., Singapore (SG)

(72) Inventors: Tadepally Venkata Seshadri, Singapore (SG); Manohar Murali, Singapore (SG); Sandeep Malhotra, Singapore (SG)

(73) Assignee: Mastercard Asia Pacific Pte. Ltd., Singapore (SG)

( * ) Notice: Subject to any disclaimer, the term of this patent is extended or adjusted under 35 U.S.C. 154(b) by 573 days.

(21) Appl. No.: 14/614,950

(22) Filed: Feb. 5, 2015

(65) Prior Publication Data
US 2015/0220890 A1    Aug. 6, 2015

(30) Foreign Application Priority Data
Feb. 6, 2014   (SG) ................. 201400893-2

(51) Int. Cl.
*G06Q 20/40* (2012.01)
*H04L 29/06* (2006.01)
(Continued)

(52) U.S. Cl.
CPC ....... *G06Q 20/4014* (2013.01); *G06Q 20/409* (2013.01); *G06Q 20/425* (2013.01);
(Continued)

(58) Field of Classification Search
CPC ........ G06Q 20/4014; G06Q 20/00–425; H04L 63/00–308; H04L 67/00–42
(Continued)

(56) References Cited

U.S. PATENT DOCUMENTS

| 7,499,889 B2 | 3/2009 | Golan et al. |
| 7,707,120 B2 | 4/2010 | Dominguez et al. |

(Continued)

OTHER PUBLICATIONS

Ron White, How Computers Work, Oct. 15, 2003, Paul Boger, Illustrated by Timothy Edward Downs, 7th Edition.*

(Continued)

*Primary Examiner* — Mohammad A. Nilforoush
*Assistant Examiner* — Wodajo Getachew
(74) *Attorney, Agent, or Firm* — Armstrong Teasdale LLP

(57) ABSTRACT

A method is provided. The method includes receiving a request message, the request message relating to a transaction between a first client and a second client, the request message including first client data and second client data, the first client data identifying an account to be used by the first client in the transaction, the second client data indicating if the second client is subscribed to a service. The method further includes determining if the second client is subscribed to the service, and generating an authentication request message if the second client is not subscribed to the service, the authentication request message requesting confirmation that a holder of the account is the first client. The method further includes sending the authentication request message, and receiving an authentication response message from the external server in response, the authentication response message including an indication whether the holder is the first client.

14 Claims, 14 Drawing Sheets

(51) Int. Cl.
*G06Q 20/42* (2012.01)
*H04L 29/08* (2006.01)

(52) U.S. Cl.
CPC ...... *H04L 63/0281* (2013.01); *H04L 67/1097* (2013.01); *H04L 67/2809* (2013.01); *H04L 67/42* (2013.01); *H04L 67/20* (2013.01)

(58) Field of Classification Search
USPC .......................................................... 705/64
See application file for complete search history.

(56) References Cited

U.S. PATENT DOCUMENTS

| | | | | |
|---|---|---|---|---|
| 7,857,212 | B1* | 12/2010 | Matthews | G06Q 10/02 235/380 |
| 8,196,200 | B1* | 6/2012 | Yeo | G06F 21/64 713/161 |
| 8,250,627 | B2 | 8/2012 | Exton et al. | |
| 8,271,395 | B2* | 9/2012 | Dominguez | G06Q 20/02 705/65 |
| 8,396,810 | B1 | 3/2013 | Cook | |
| 9,105,027 | B2* | 8/2015 | Hammad | G06F 21/34 |
| 2001/0044787 | A1 | 11/2001 | Shwartz et al. | |
| 2003/0195858 | A1 | 10/2003 | Watanabe et al. | |
| 2003/0200184 | A1* | 10/2003 | Dominguez | G06Q 20/02 705/78 |
| 2009/0037982 | A1* | 2/2009 | Wentker | G06F 21/33 726/3 |
| 2010/0082486 | A1* | 4/2010 | Lee | G06Q 20/12 705/44 |
| 2010/0114740 | A1* | 5/2010 | Dominguez | G06Q 20/40 705/26.1 |
| 2010/0125737 | A1* | 5/2010 | Kang | G06Q 20/12 713/176 |
| 2010/0268648 | A1* | 10/2010 | Wiesman | G06Q 20/04 705/44 |
| 2011/0167002 | A1* | 7/2011 | Balasubramanian | G06Q 20/04 705/44 |
| 2011/0196791 | A1* | 8/2011 | Dominguez | G06Q 40/00 705/44 |
| 2011/0276495 | A1* | 11/2011 | Varadarajan | G06F 21/31 705/71 |
| 2012/0011065 | A1* | 1/2012 | Winfield-Chislett | G06Q 20/02 705/42 |
| 2012/0011066 | A1* | 1/2012 | Telle | G06Q 20/385 705/44 |
| 2012/0030114 | A1* | 2/2012 | Sikljovan | G06Q 20/40 705/44 |
| 2012/0066129 | A1* | 3/2012 | Dominguez | G06F 21/33 705/44 |
| 2013/0073463 | A1* | 3/2013 | Dimmick | G06Q 20/40 705/44 |
| 2013/0073744 | A1* | 3/2013 | Ratica | G06F 9/4451 709/240 |
| 2013/0151400 | A1* | 6/2013 | Makhotin | G06Q 20/3227 705/39 |
| 2013/0238499 | A1* | 9/2013 | Hammad | G06Q 20/3227 705/44 |
| 2013/0275308 | A1* | 10/2013 | Paraskeva | G06Q 20/32 705/71 |
| 2014/0101036 | A1* | 4/2014 | Phillips | G06Q 20/027 705/39 |
| 2014/0101048 | A1* | 4/2014 | Gardiner | G06Q 20/3276 705/44 |
| 2014/0214688 | A1* | 7/2014 | Weiner | G06Q 20/3227 705/71 |
| 2014/0337175 | A1* | 11/2014 | Katzin | G06Q 20/204 705/26.62 |
| 2014/0373093 | A1 | 12/2014 | Wood et al. | |
| 2017/0091772 | A1* | 3/2017 | Piel | G06Q 20/12 |

OTHER PUBLICATIONS

Ron White, How Computers Work, Oct. 15, 2003, Paul Boger, Illustrated by Timothy Edward Downs, 7th Edition (Year: 2003).*

* cited by examiner

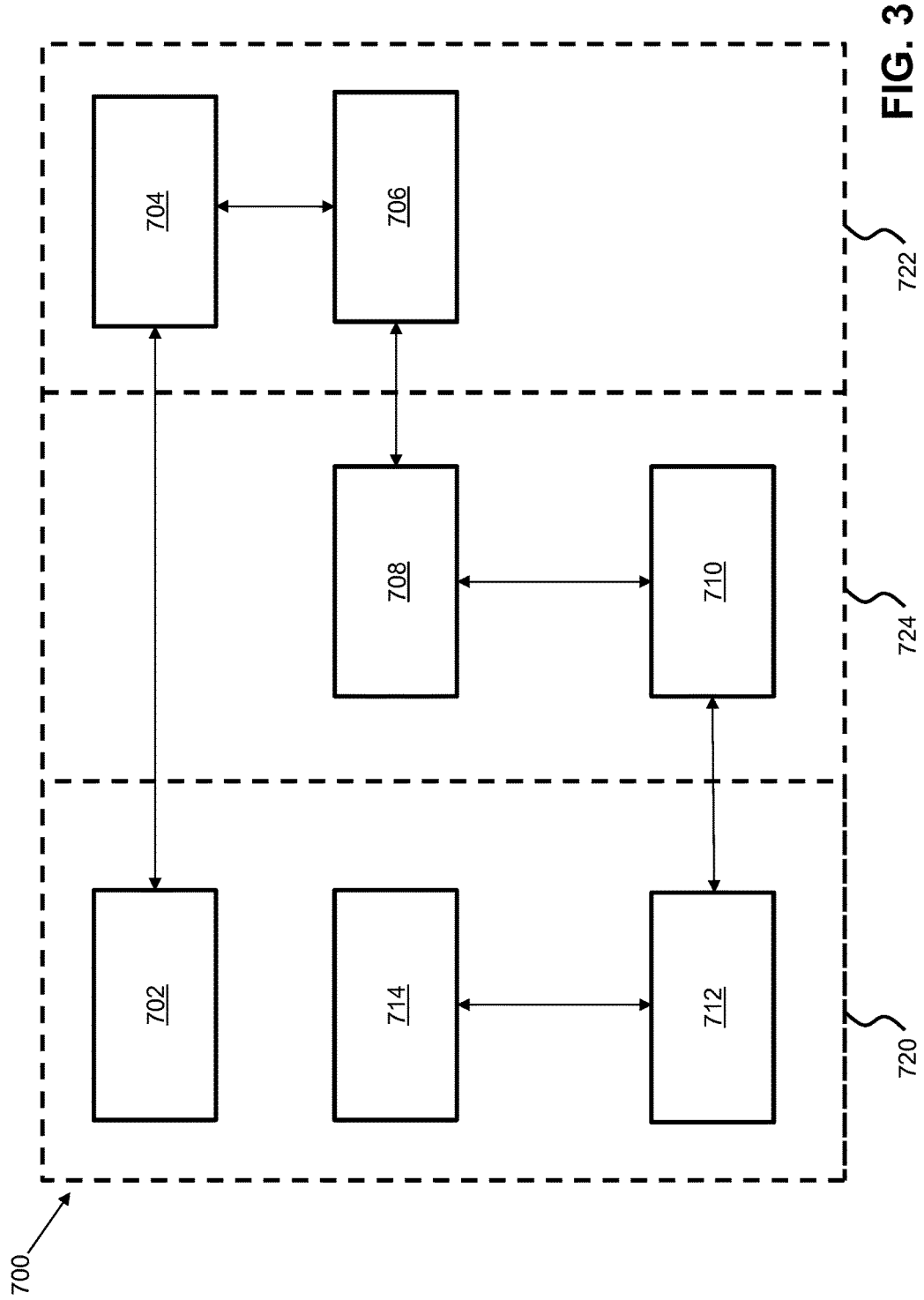

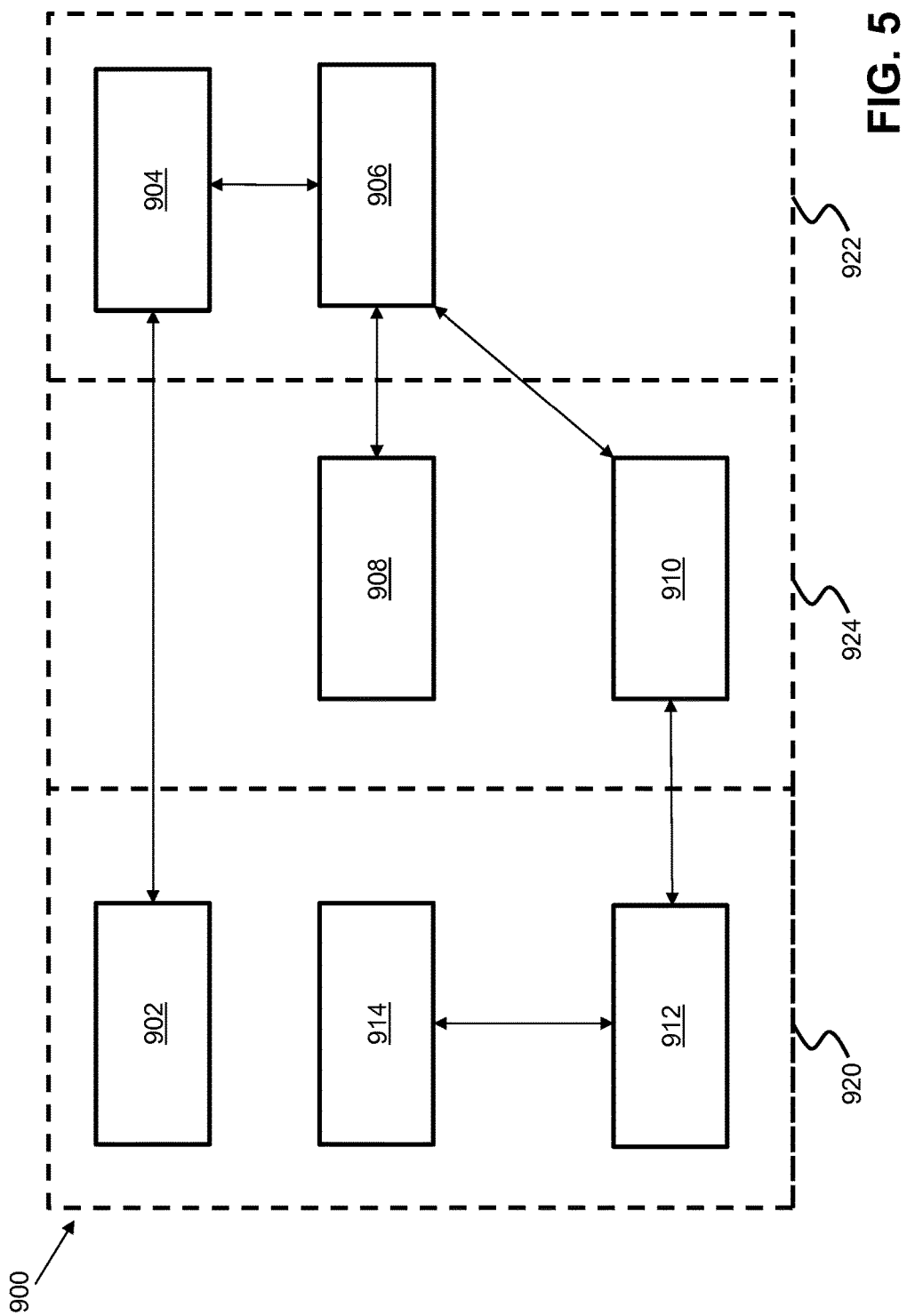

METHOD AND CORRESPONDING PROXY SERVER, SYSTEM, COMPUTER-READABLE STORAGE MEDIUM AND COMPUTER PROGRAM

CROSS REFERENCE TO RELATED APPLICATIONS

This application claims the benefit of SG Patent Application No. 201400893-2 filed Feb. 6, 2014, which is hereby incorporated by reference in its entirety.

BACKGROUND OF THE DISCLOSURE

The field of the disclosure relates generally to a method and a corresponding proxy server, system, computer-readable storage medium and computer program, and, more particularly, to an authentication method which authenticates a client party to a transaction by determining if the client is a holder of an account provided by the client to be used in the transaction.

With the proliferation of the Internet, more and more people are using e-commerce to conduct transactions. Conducting transactions over the Internet has the advantage of convenience, lower costs and mass market reach for both merchants and clients. However, the anonymity of an e-commerce transaction brings potential issues of fraud and misuse. It is beneficial for a transacting merchant to confirm if a person who initiates a remote transaction (e.g. a client) is a holder of an account which they request to be used in the transaction. It is also beneficial for the holder of the account to be informed when a transaction is initiated using his account.

There are standardized services or protocols which allow merchants to authenticate transactions thereby reducing the likelihood of fraud. Such services may be generally referred to as authentication services. One such example is the 3-D Secure™ Network service. The 3-D Secure™ Network service leverages existing Secure Socket Layer (SSL) encryption functionality and provides enhanced security through authentication of the client. A participating merchant typically subscribes to the 3-D Secure™ Network. As a subscriber to the 3-D Secure™ Network service, the participating merchant may use a piece of software called Merchant-Plug-In (MPI) to exchange messages and pass information to the card issuer to authenticate the card account to be used in the transaction. In this way, the participating merchant establishes an authentication session to confirm if the client is the rightful holder of the account. However, merchants may prefer not to subscribe to such authentication services to avoid card abandonments and improved user experience.

In view of the above, it would be desirable to authenticate a transaction without requiring the transacting merchant to first subscribe to an authentication service.

BRIEF DESCRIPTION OF THE DISCLOSURE

Various embodiments provide a method comprising receiving a request message at a proxy server, the request message relating to a transaction between a first client and a second client, the request message comprising first client data and second client data, the first client data identifying an account to be used by the first client in the transaction, the second client data indicating if the second client is subscribed to a service; determining if the second client is subscribed to the service based on the second client data at the proxy server; generating an authentication request message at the proxy server if it is determined that the second client is not subscribed to the service, the authentication request message requesting confirmation that a holder of the account is the first client; sending the authentication request message from the proxy server to an external server; and receiving an authentication response message from the external server at the proxy server in response to sending the authentication request message, the authentication response message comprising an indication of whether the holder of the account is the first client.

In an embodiment, the request message indicates a type of the transaction and the authentication request message is generated only if the type is a predetermined type.

In an embodiment, the first client data indicates if the holder of the account is subscribed to the service and the authentication request message is generated if the first client data indicates that the holder of the account is subscribed to the service.

In an embodiment, the method further includes holding the request message at the proxy server for a preset time period if the authentication request message is generated.

In an embodiment, the method further includes generating a transaction request message at a first client device associated with the first client, the transaction request message comprising the first client data.

In an embodiment, the method further includes sending the transaction request message from the first client device to a second client device associated with the second client to initiate the transaction.

In an embodiment, the method further includes generating the request message at the second client device based on the transaction request message and sending the request message from the second client device to the proxy server.

In an embodiment, the external server is an issuer server associated with an issuer of the account, the authentication request message further comprising the account data from the request message.

In an embodiment, the method further includes generating a verification request message at the issuer server based on verification data stored in association with the first client data by the issuer server, the verification data identifying a verification device of the holder of the account, the verification request message requesting password data for verification.

In an embodiment, the method further includes sending the verification request from the issuer server to the verification device and outputting a password request message for the password data from the verification device to a user of the verification device.

In an embodiment, the method further includes receiving an input at the verification device from the user of the verification device and sending the input from the verification device to the issuer server.

In an embodiment, the method further includes generating the authentication response message at the issuer server and sending the authentication response message from the issuer server to the proxy server, wherein the indication in the authentication response message is based on a comparison between the input and a password identified in the verification data.

In an embodiment, the method further includes modifying the request message to include the indication at the proxy server to form a modified request message.

In an embodiment, the method further includes sending the modified request message from the proxy server to the issuer server.

In an embodiment, the method further includes authorizing the transaction at the issuer server based on the indication in the modified request message.

In an embodiment, the method further includes generating a receipt message at the issuer server, the receipt message indicating whether or not the transaction has been authorized.

In an embodiment, the proxy server is an acquirer server associated with an acquirer, the acquirer being an administrator of a second client account to be used by the second client in the transaction.

In an embodiment, each message exchanged between the acquirer server and the issuer server is exchanged via a payment network server.

In an embodiment, the proxy server is a payment network server, the payment network server being configured to communicate with an acquirer server associated with an acquirer, the acquirer being an administrator of a second client account to be used by the second client in the transaction.

In an embodiment, the request message is sent from the second client device to the payment network server via the acquirer server.

In an embodiment, the second client is a merchant and the first client is a customer who initiates the transaction with the merchant.

In an embodiment, the transaction is a payment transaction between the first client and the second client.

Various embodiments provide a proxy server comprising at least one processor; and at least one memory including computer program code; the at least one memory and the computer program code configured to, with the at least one processor, cause the proxy server at least to: receive a request message, the request message relating to a transaction between a first client and a second client, the request message comprising first client data and second client data, the first client data identifying an account to be used by the first client in the transaction, the second client data indicating if the second client is subscribed to a service; determine if the second client is subscribed to the service based on the second client data; generate an authentication request message if it is determined that the second client is not subscribed to the service, the authentication request message requesting confirmation that a holder of the account is the first client; send the authentication request message to an external server; and receive an authentication response message from the external server in response to sending the authentication request message, the authentication response message comprising an indication of whether the holder of the account is the first client.

In an embodiment, the request message indicates a type of the transaction and the authentication request message is generated only if the type is a predetermined type.

In an embodiment, the first client data indicates if the holder of the account is subscribed to the service and the authentication request message is generated if the first client data indicates that the holder of the account is subscribed to the service.

In an embodiment, the at least one memory and the computer program code is further configured with the at least one processor to cause the proxy server to hold the request message at the proxy server for a preset time period if the authentication request message is generated.

In an embodiment, the second client is a merchant and the first client is a customer who initiates the transaction with the merchant.

In an embodiment, the transaction is a payment transaction between the first client and the second client.

Various embodiments provide a system comprising a proxy server in an embodiment; and a first client device associated with the first client, wherein the first client device is configured to generate a transaction request message comprising the first client data.

In an embodiment, the system further includes a second client device associated with the second client, wherein the first client device is configured to send the transaction request message to the second client device and the second client device is configured to receive the transaction request message from the first client device to initiate the transaction.

In an embodiment, the second client device is further configured to generate the request message based on the transaction request message and to send the request message to the proxy server.

In an embodiment, wherein the external server is an issuer server associated with an issuer of the account, and wherein the issuer server is configured to receive the authentication request message from the proxy server, the authentication request message further comprising the first client data from the request message.

In an embodiment, the issuer server is further configured to store verification data in association with the first client data and to generate a verification request message based on the verification data, the verification request requesting password data for verification.

In an embodiment, the system further comprising a verification device of the holder of the account, the verification data identifying the verification device, wherein the issuer server is configured to send the verification request message to the verification device, and wherein the verification device is configured to output a password request message for the password data from the verification device to a user of the verification device.

In an embodiment, the verification device is further configured to receive an input from the user of the verification device and to send the input from the verification device to the issuer server.

In an embodiment, the issuer server is further configured to generate the authentication response message and to send the authentication response message to the proxy server, and wherein the issuer server generates the indication in the authentication response message based on a comparison between the input and a password identified in the verification data.

In an embodiment, the proxy server is further configured to modify the request message to include the indication to form a modified request message.

In an embodiment, the proxy server is further configured to send the modified request message to the issuer server.

In an embodiment, the issuer server is further configured to authorize the transaction based on the indication in the modified request message.

In an embodiment, the issuer server is further configured to generate a receipt message, the receipt message indicating whether or not the transaction has been authorized.

In an embodiment, the proxy server is an acquirer server associated with an acquirer, the acquirer being an administrator of a merchant account to be used by the merchant in the transaction.

In an embodiment, the system is configured such that each message exchanged between the acquirer server and the issuer server is exchanged via a payment network server.

In an embodiment, the proxy server is a payment network server, the payment network server being configured to communicate with an acquirer server associated with an acquirer, the acquirer being an issuer of a second client account to be used by the second client in the transaction.

In an embodiment, the system is configured such that the request message is sent from the second client device to the payment network server via the acquirer server.

In an embodiment, the second client is a merchant and the first client is a customer who initiates the transaction with the merchant.

In an embodiment, the transaction is a payment transaction between the first client and the second client.

Various embodiments provide a proxy server comprising means for receiving a request message, the request message relating to a transaction between a first client and a second client, the request message comprising first client data and second client data, the first client data identifying an account to be used by the client in the transaction, the second client data indicating if the second client is subscribed to a service; means for determining if the second client is subscribed to the service based on the second client data; means for generating an authentication request message if it is determined that the second client is not subscribed to the service, the authentication request message requesting confirmation that a holder of the account is the first client; means for sending the authentication request message to an external server; and means for receiving an authentication response message from the external server in response to sending the authentication request message, the authentication response message comprising an indication of whether the holder of the account is the first client.

Various embodiments provide a computer-readable storage medium having stored thereon computer program code which when executed by a computer causes the computer to execute a method in accordance with an embodiment.

Various embodiments provide a computer program comprising software code adapted to perform a method in accordance with an embodiment.

Various embodiments provide computer-readable storage media having computer-executable instructions embodied thereon, wherein, when executed by at least one processor, the computer-executable instructions cause the processor to receive a request message, the request message relating to a transaction between a first client and a second client, the request message including first client data and second client data, the first client data identifying an account to be used by the first client in the transaction, the second client data indicating if the second client is subscribed to a service, determine if the second client is subscribed to the service based on the second client data, generate an authentication request message if it is determined that the second client is not subscribed to the service, the authentication request message requesting confirmation that a holder of the account is the first client, send the authentication request message to an external server, and receive an authentication response message from the external server in response to sending the authentication request message, the authentication response message comprising an indication of whether the holder of the account is the first client.

BRIEF DESCRIPTION OF THE DRAWINGS

Embodiments will be better understood and readily apparent to one of ordinary skill in the art from the following written description, by way of example only, and in conjunction with the drawings, wherein like reference signs relate to like components, in which:

FIG. 3 is a block diagram of a system in accordance with a third embodiment;

FIG. 5 is a block diagram of a system in accordance with a fourth embodiment;

DETAILED DESCRIPTION OF THE DISCLOSURE

Figure 1:
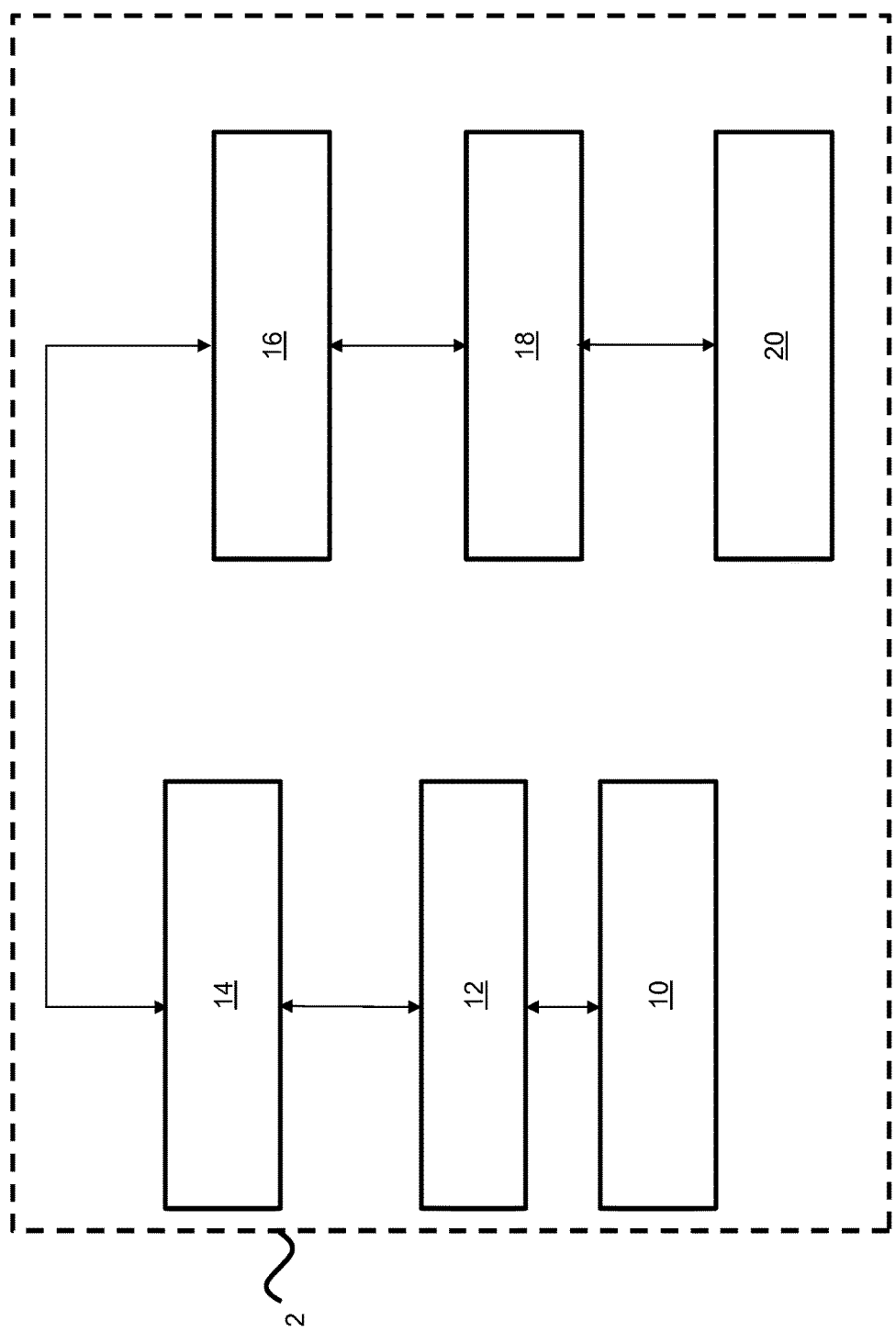
FIG. 1 is a block diagram of a system in accordance with a first and a second embodiment.

Embodiments will be described, by way of example only, with reference to the drawings. Like reference numerals and characters in the drawings refer to like elements or equivalents.

Some portions of the description which follow are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", "establishing", "receiving", "sending", "identifying", "transmitting", "comparing", "extracting" or the like, refer to the action and processes of a computer system, or similar electronic device, that manipulates and transforms data represented as physical quantities within the computer system into other data similarly represented as physical quantities within the computer system or other information storage, transmission or display devices.

In addition, the present specification also implicitly discloses a computer program and the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer-readable medium. The computer-readable medium may include storage devices such as magnetic or optical disks, memory chips, or other storage devices suitable for interfacing with a computing device. The computer-readable medium may also include a hard-wired medium such as exemplified in the Internet system, or wireless medium such as exemplified in the GSM, GPRS, 3G or 4G mobile telephone systems. The computer program when loaded and executed on such a general-purpose computer effectively results in an apparatus that implements the steps of a method in accordance with an embodiment.

The embodiments described herein may also be implemented as hardware modules. More particular, in the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

Various embodiments relate to a method and a corresponding proxy server, system, computer-readable storage medium and computer program. In an embodiment, the method is an authentication method which authenticates a customer party to a transaction by determining if the customer is a holder of an account provided by the customer to be used in the transaction.

FIG. 1 illustrates a system 2 in accordance with a first embodiment. The system 2 illustrates elements that may be utilized to perform an authentication process relating to a transaction between a first client and a second client. In an embodiment, the first client is a customer who initiates the transaction and the second client is a merchant who is a party to the transaction. For example, the customer may initiate the transaction with the merchant to buy goods and/or services from the merchant. In an embodiment, the "customer" may be a term used to refer to the first client and the "merchant" may be a term used to refer to the second client. In an embodiment, the transaction is a payment transaction. In other words, completion of the transaction involves a payment between parties to the transaction.

The system 2 includes a first client device 10 in communication with a second client device 12. In an embodiment, the first client device is a customer device and the second client device is a merchant device. In the description which follows, the terms "customer", "merchant", "customer device" and "merchant device" will be used. However, it is to be understood that in an embodiment, these terms could be interchanged with "first client", "second client", "first client device" and "second client device".

The merchant device 12 is in communication with an acquirer server 14. The acquirer server 14 is in communication with a payment network server 16. The payment network server 16 is in communication with an issuer server 18. The issuer server 18 is in communication with a verification device 20.

In an embodiment, a 'server' may be understood to mean a single computing device or a plurality of interconnected computing devices which operate together to perform a particular function. That is, the server may be contained within a single hardware unit or be distributed among several or many different hardware units. An exemplary computing device is described below with reference to FIG. 7.

The customer device 10 may be associated with the customer who is a party to the transaction. In an embodiment, the authentication process authenticates the customer before the transaction is authorized. That is, first, a process of confirming that the customer is the true holder of an account provided by the customer for use in the transaction is performed and, second, the transaction may be authorized based on whether the customer is confirmed to be the true holder. In an embodiment, the customer device 10 may be a computing device or a wireless computing device. In an embodiment, the customer device 10 may be a handheld or portable or mobile device carried or used by the customer, or may refer to other types of electronic devices such as a personal computer, a land-line telephone, an interactive voice response (IVR) system, and the like. In some embodiments, a mobile device may be a device, such as a mobile phone, a laptop computer, a personal digital computer (PDA), a mobile computer, a portable music player (such as an iPod™ and the like). An exemplary wireless computing device is described below with reference to FIG. 6.

The merchant device 12 may be associated with the merchant who is also a party to the transaction. In an embodiment, the merchant device 12 may be a computing device or a wireless computing device. In an embodiment, the merchant device may be a point-of-sale (POS) terminal, an automatic teller machine (ATM), a personal computer, a computer server (hosting a website, for example), an IVR system, a land-line telephone, or any type of mobile device such as a mobile phone, a personal digital assistant (PDA), a laptop computer, a tablet computer and the like.

The acquirer server 14 may be associated with an acquirer. It is to be understood that an acquirer may be an entity (e.g. a company or organization) which issues (e.g. establishes, manages, administers) an account (e.g. a financial bank account) of the merchant. Examples of the acquirer include a bank and/or other financial institution. In an embodiment, the acquirer server 14 may include one or more computing devices that are used to establish communication with another server by exchanging messages with and/or passing information to the other server.

In an embodiment, the payment network server 16 may be associated with a third party, for example, a payment network server 16 may be the Banknet® network operated by MasterCard®. The third party (e.g. MasterCard®) may be an entity (e.g. a company or organization) who operates to process transactions, clear and settle funds for payments between two entities (e.g. two banks). The payment network server 16 may include one or more computing devices that are used for processing. Those skilled in the art will appreciate that other servers may also be used.

In an embodiment, the issuer server 18 may include one or more computing devices that are used to perform a payment transaction. The issuer server 18 may be associated with an issuer. It is to be understood that an issuer may be an entity (e.g. a company or organization) which issues (e.g. establishes, manages, administers) an account (e.g. a financial bank account) of an account holder or an account owner. In an embodiment, the issuer may authorize a transaction after the customer has been authenticated. In an embodiment, the issuer server 18 may be configured to communicate with, or may include, a database. The database stores data corresponding to each account issued by the issuer. Examples of the data include a password, an account holder name and address, a credit limit and/or an indicator indicating whether the holder is a subscriber to an authentication service, such as, the 3-D Secure™ Network service.

In an embodiment, the verification device 20 may be a computing device or a wireless computing device. In an embodiment, the verification device 20 may be a handheld or portable or mobile device carried or used by the holder of the account, or may refer to other types of electronic devices such as a personal computer, a land-line telephone, an IVR system, and the like. In some embodiments, a mobile device may be a device, such as a mobile phone, a laptop computer, a personal digital computer (PDA), a mobile computer, a portable music player (such as an iPod™ and the like), that has a suitable application stored, loaded or otherwise installed in or on the mobile device such that the holder can be contacted at a verification address (e.g. a land-line telephone number, a mobile phone number or an electronic mail address). In an embodiment, the customer device 10 is also the verification device 20. In another embodiment, the customer device 10 and the verification device 20 can be separate devices.

FIGS. 2A-2I show flow diagrams of a method performed by the above-described elements in accordance with the first embodiment. In the first embodiment, the method aims to send a message of whether a holder of an account is the customer who designated the account for use in the transaction. The following describes FIGS. 2A-2I in turn.

Figure 2C:
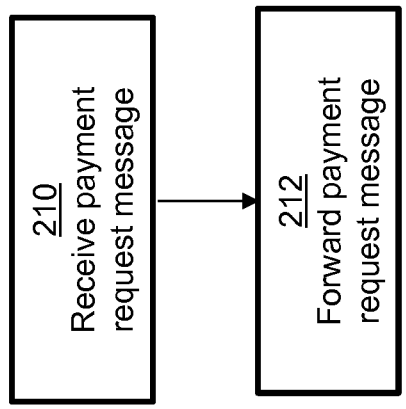
FIGS. 2A-2I are each a flow diagram of a method in accordance with the first embodiment of FIG. 1.
Figure 2B:
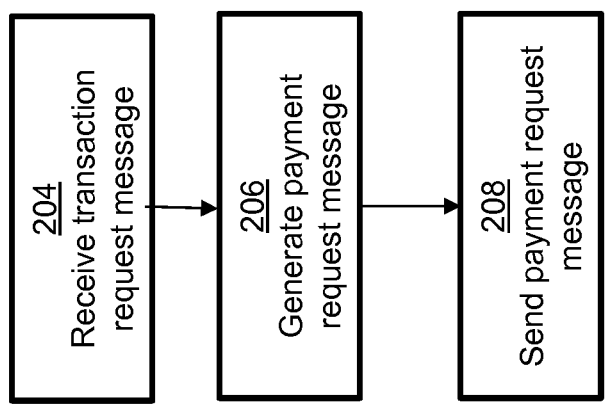
Figure 2A:
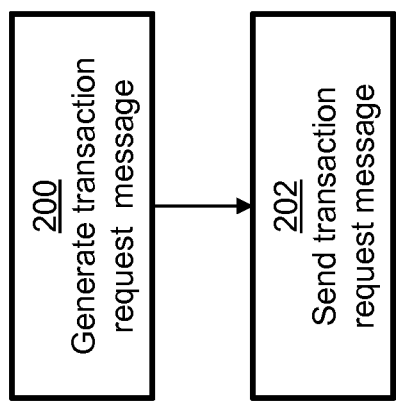

In FIG. 2A, processing begins at operation 200. At operation 200, a transaction request message is generated at the customer device. In an embodiment, the transaction request message is generated by the customer after he makes a selection of a good and/or service to be purchased on a website hosted by the merchant. Therefore, the transaction request message relates to a transaction between the customer and the merchant.

The transaction request message may include transaction data and/or data relating to the customer (i.e. customer data). The transaction data may identify the good and/or service to be purchased. The transaction data may further identify a value or price of the good and/or service. The transaction data may also indicate a time and date at which the transaction was initiated. The customer data refers to data identifying the account indicated by the client to be used in the transaction. In an embodiment, the customer data is also known as account data. The account data may include the name of the account holder, the primary account number (or "PAN") and the date of expiry of the account (if applicable).

The PAN refers to a number of digits (or characters) which identify an account issued by an issuer (for example, a bank). For example, in some embodiments an account (e.g. credit account, debit account, pre-paid account) is issued by an issuer pursuant to the MasterCard® International Incorporated rules, and the PAN may be a twelve to nineteen-digit string that identifies both the issuer (e.g. which may be based on the first few digits of the string, for example, the first five to ten digits) and the specific account (e.g. which may be based on some or all of the remaining digits). The PAN may also identify if the holder is subscribed to a standardized Internet transaction protocol such as the 3-D Secure™ Network service. In an embodiment, the 3-D Secure™ Network service may underlie the authentication programs offered by payment networks (e.g. SecureCode™ by MasterCard®) to authenticate a customer for a merchant during an eCommerce transaction. In an embodiment, the issuer authenticates a customer. The PAN is typically utilized to route and process transactions that involve the account. Those skilled in the art will appreciate that other primary account schemes and formats may be used in conjunction with embodiments described herein.

In an example, the customer may select the good and/or service (e.g. a basketball) that he would like to purchase from a website (e.g. www.amazon.com) hosted by the merchant (e.g. Amazon™) over the Internet. The selection may be done on his customer device (e.g. a personal computer). He may indicate a type of the good and/or service (e.g. a basketball) and a quantity of the good and/or service (e.g. five). The customer may be informed of a corresponding transaction amount to pay. The transaction amount corresponds to the value of the good and/or service to be purchased (e.g. the transaction amount is five times the value of one basketball). In this example, the transaction data refers to data identifying the good and/or service (e.g. five basketballs) to be purchased, and a value of the good and/or service (e.g. the total cost of five times the value of one basketball).

On the same website or a different pop-up website, the customer may be prompted to fill in the details of the mode of payment. He may fill in data of an account including the name which the account was registered to, the PAN and the date of expiry of the account (if applicable). In some instances, the customer may also be prompted to enter the security data for the account. In an embodiment, the customer may be prompted to enter the Card Verification Value ("CVV") or Card Security Code ("CSC") or Card Verification Code ("CVC") from a payment card. Such data identifying the account is included in the account data. In this way, a transaction request message may be generated using the transaction data and the account data.

In an embodiment, the customer device may be configured to communicate with the merchant device via a website. The website may be hosted by the merchant device. The information communicated between the customer device and the merchant device may be included in the transaction request message.

At operation 202, the transaction request message is sent from the customer device to the merchant device. In an embodiment, the customer device and the merchant device are in communication with a network, such as, the Internet. In this example, the transaction request message is sent from the customer device to the merchant device via the network. By way of example, the transaction request message is sent from the customer's personal computer to a computer server hosted by Amazon™.

The operations of FIG. 2A are performed by the customer device, as described above. The operations of the merchant device will now be described with reference to FIG. 2B.

At operation 204, the transaction request message is received at the merchant device. By way of example, the transaction request message is received at a computer server hosted by Amazon™. In the above example, the merchant, Amazon™, is informed that a customer would like to purchase five basketballs via its website.

At operation 206, a request message is generated at the merchant device which acts to request the issuer to authorize or perform the transaction. In an embodiment, the request message is a payment request message. In an embodiment, the transaction is done via the Internet and the payment request message may include merchant data. The merchant data may indicate the address of the merchant's website, the type of the transaction and/or if the merchant is subscribed to an authentication service, such as, the 3-D Secure™ Network service. It is to be understood that other authentication services may be used in some other embodiments. As mentioned above, if the merchant is subscribed to the 3-D Secure™ Network service, the merchant may exchange messages and pass information to the issuer to authenticate the account to be used in the transaction. For example the merchant may communicate with the payment network server so as to authenticate the customer. However, if the merchant is not subscribed to any authentication service, the merchant may not be able to get the results of the authentication of the customer's account as the merchant would not be performing the authentication request.

In the example, the computer server hosted by Amazon™ may generate a payment request message to include merchant data identifying the merchant. The merchant data may include the name and/or address of the merchant (e.g. Amazon™), the website of the merchant (e.g. www.amazon.com), an indicator indicating if the merchant is or is not subscribed to an authentication service. Additionally, the payment request message may also include the above-described transaction data (e.g. five basketballs and the total value of the five basketballs) and the above-described account data (e.g. the name of the account holder, the PAN and the date of expiry of the account).

At operation 208, the payment request message is sent from the merchant device to the acquirer server. The transaction data in the payment request message may serve as a request for the issuer to authorize the transaction. In other words, the acquirer server may be permitted to obtain the transaction amount on behalf of the merchant. In the example, Amazon™ makes a request for an amount equivalent to the value of five basketballs to the acquirer (e.g. the merchant's bank).

The operations of FIG. 2B are performed by the merchant device, as described above. The operations of the acquirer server will now be described with reference to FIG. 2B.

At operation 210, the payment request message is received at the acquirer server. In this way, the acquirer is informed of the transaction and that the merchant would like the transaction to be authorized.

At operation 212, the payment request message is forwarded from the acquirer server to the payment network server. In an embodiment, the acquirer server may not do further processing to the payment request message and, instead, may merely receive the payment request message from the merchant device and forward it to the payment network server.

The operations of FIG. 2C are performed by the acquirer server, as described above. The operations of the payment network server will now be described with reference to FIG. 2D.

At operation 214, the payment request message is received at the payment network server. In this way, the payment network server is informed of the transaction and that the merchant would like to obtain authorization of the transaction. As mentioned above, the role of the payment network server may be to facilitate communication between the acquirer server and the issuer server. That is, the acquirer server may not know how to communicate with the issuer server, but may know how to communicate with the payment network server. Likewise, the issuer server may not know how to communicate with the acquirer server, but may know how to communicate with the payment network server. Therefore, the payment network server may serve as a means through which the acquirer server may communicate with the issuer server in order that payments and authentication may be performed.

In this embodiment, the payment network server is configured to hold the payment request message based on one or more conditions. The one or more conditions will be described in more detail in operations 216, 218 and/or 220. It is to be understood that in the following example, three conditions are explained and each condition must be met in order that the payment request message to be held. However, in some other embodiments, only one or two of the conditions need to be met for the payment request message to be held.

At operation 216, the payment network server examines the payment request message to determine if the merchant is subscribed to an authentication service, such as the 3-D Secure™ Network service. In another embodiment, the authentication service may be a different authentication service. As described in operation 206, in an embodiment, the merchant data indicates if the merchant is subscribed to the service. The payment network server may examine the merchant data included in the payment request message to determine if the merchant is subscribed to the service. Processing flows from operation 216 to operation 228 if it has been determined that the merchant is subscribed to the service. Processing flows from operation 216 to operation 218 if it has been determined that the merchant is not subscribed to the service.

At operation 218, if it is determined that the merchant is not subscribed to the service, the payment network server further examines the payment request message to determine if the type of transaction is a predetermined type. In an embodiment, the predetermined type may refer to a transaction that is done electronically over the Internet, such as an e-commerce transaction type. However, in another embodiment, the predetermined type could be different, for example, an automatic POS transaction type. Processing flows from operation 218 to the operation 228 if it has been determined that the type of transaction is not the predetermined type. Processing flows from operation 218 to operation 220 if it has been determined that the type of transaction is the predetermined type.

At operation 220, if it is determined that the type of the transaction is the predetermined type, the payment network server further examines the payment request message to determine if the issuer of the account is subscribed to the authentication service, such as the 3-D Secure™ Network service. In an embodiment, the payment network server determines if the issuer of the account is subscribed to the service based on the account data. For example, if the account data includes a PAN, some digits included in the PAN may indicate if the issuer of the account is subscribed to the service. In an embodiment, the payment network server may be in communication with, or may include, a database which may store data associated with the account based on the PAN. The stored data may indicate if the issuer of the account is subscribed to the service. The payment network server may access the database to read the data associated with the PAN to determine if the issuer is subscribed to the service. Processing flows from operation 220 to the operation 228 if it has been determined that the issuer is not subscribed to the service. Processing flows from operation 220 to operation 222 if it has been determined that the issuer is subscribed to the service.

At operation 222, if it is determined that the issuer is subscribed to the service, the payment network server generates an authentication request message. In an embodiment, the authentication request message may include the merchant data and the account data from the payment request message.

In an embodiment, the merchant data and the account data may be used to verify that the holder is the person who initiated the transaction. For example, the authentication request message may indicate that a transaction has been initiated with Amazon™ on www.amazon.com. In this way, the holder may confirm that he is the person who initiated the transaction or be informed if his account is being used maliciously. Accordingly, the authentication request message may be generated to confirm if a holder of the account is the same as the customer.

At operation 224, if the authentication request message is generated, the payment network server holds the payment request message. The payment network server may hold, without sending, the payment request message for a preset time period. In an embodiment, the preset time period may be 20, 50, 100 or 120 seconds. In an embodiment, the payment network server may perform other processing while holding the authentication request message.

In an embodiment, if it is determined that one or more of the three conditions in operations 216, 218 and/or 220 is met; the payment network server may hold the payment request message. In such an instance, the payment network server may generate the authentication request message based on the held payment request message. In other words, in one embodiment, the payment request message may be held before the authentication request message is generated. As mentioned above, in an embodiment, the payment request message may be held and the authentication request message may be generated if only one condition is met.

At operation 226, the payment network server may send the authentication request message to the issuer server. In an embodiment, the payment network server sends the generated authentication request message while holding the payment request message.

At operation 228, if it has been determined that the merchant is subscribed to the service, the type of transaction is not the predetermined type and/or the issuer is not subscribed to the service, the payment network server forwards the payment request message to the issuer server, without further processing, in a manner known to a person skilled in the art. In this way, if any one of the conditions in operations 216, 218 and/or 220 is not met, the payment network server does not impede the normal transaction flow between the acquirer server and the issuer server.

Figure 2D:
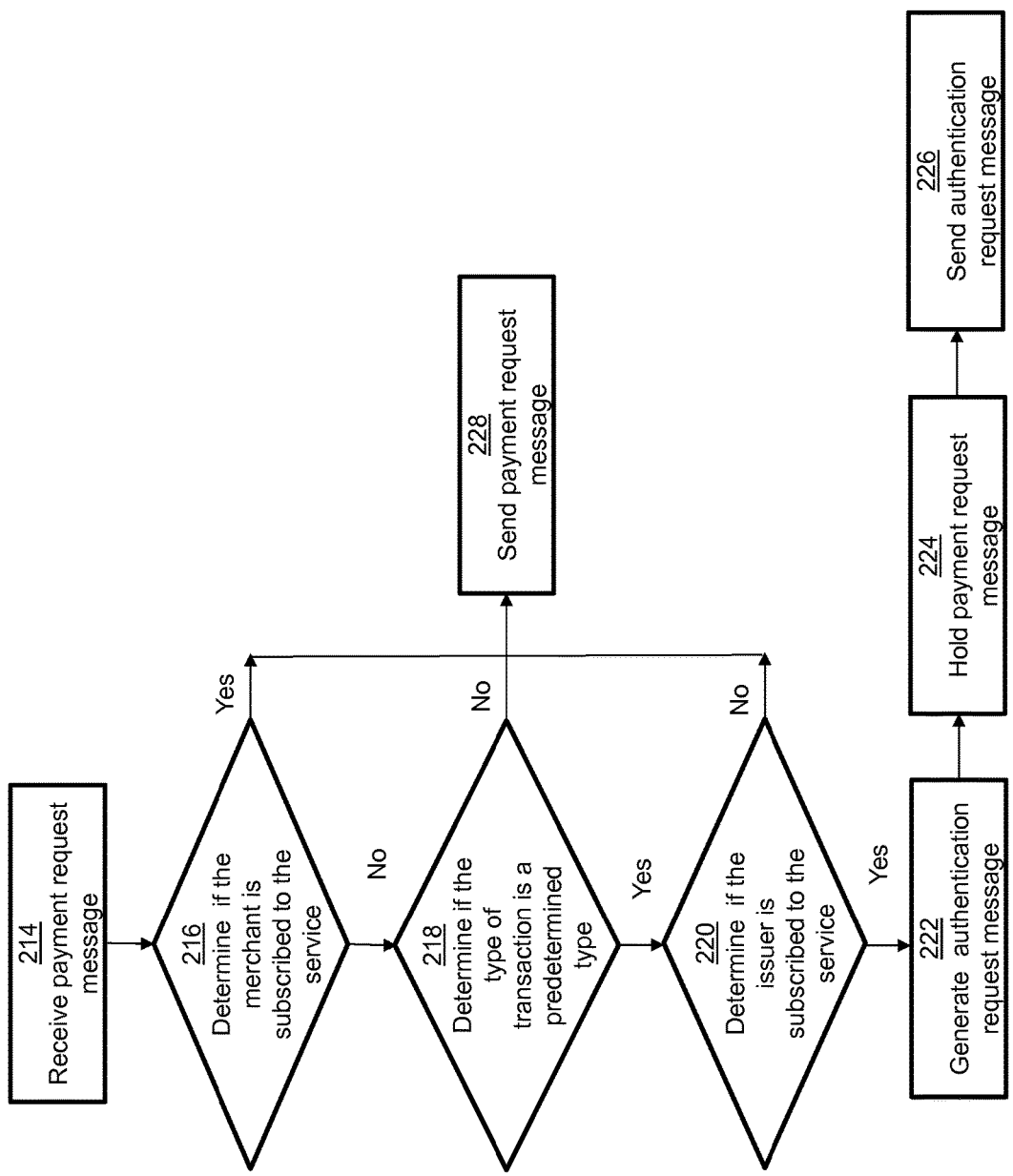

The operations of FIG. 2D are performed by the payment network server, as described above. The corresponding operations of the issuer server will now be described with reference to FIG. 2E.

At operation 230, the issuer server receives the authentication request message from the payment network server. As mentioned above, at operation 222, the authentication request message may include account data. The account data may include the PAN. The PAN identifies the issuer which issued the account identified by the account data. In this way, upon receiving the authentication request message, the issuer is informed that (i) one of its issued accounts has been used in a transaction, and (ii) that it must check to confirm that the party requesting that the account be used in the transaction is the true holder of the account.

At operation 232, the issuer server generates a verification request message. In an embodiment, the issuer server may be configured to store verification data in association with the account data. The verification data may indicate a contact address of the holder of the account. The contact address may be a mobile number or an email address at which the holder of the account may be contacted. Additionally, the verification data may include a password or other information which may be used to test a user of the account (e.g. the customer) to confirm that they are the true holder of the account. The verification request message may be generated based the verification data. For example, if the verification data which corresponds to the account indicates that the holder prefers to do verification on a mobile phone, a verification request message may be generated as a Short Message Service (SMS) message or an Interactive Voice Response (IVR) message. The verification request message may be configured to request password data (e.g. a password or part of a password) from a user of the verification device. The obtained password data can then be compared to the verification data to determine if the customer is the true holder of the account.

At operation 234, the issuer server sends the verification request message to a verification device. In an embodiment, the verification request message may or may not be in the same format as the transaction request message. That is, the verification request message may be an in-band or out-of-band message. An out-of-band message refers to a message that is sent via a communication path, type or protocol which is different to the current communication path, type or protocol. Therefore, if message flow thus far has been via the Transmission Control Protocol/Internet Protocol (TCP/IP), the verification request message may be sent via SMS so as to be an out-of-band message. In other words, an out-of-band message typically makes use of two separate networks which work simultaneously to authenticate a user. For example, a fraudulent user may initiate a transaction via a first network and the holder of the account will be informed of such a transaction via a second network. This provides an opportunity to the holder of the account to stop the transaction. Advantageously, an out-of-band message may be used to authenticate a customer even if a fraudulent user gains access to a holder's account.

For example, the customer may initiate a transaction on a website using a personal computer. A holder of the account, who may or may not be the customer, may receive the verification request message via an SMS message on their pre-designated mobile phone number. In this case, the mobile phone may be the verification device and the SMS may be the out-of-band message.

Figure 2F:
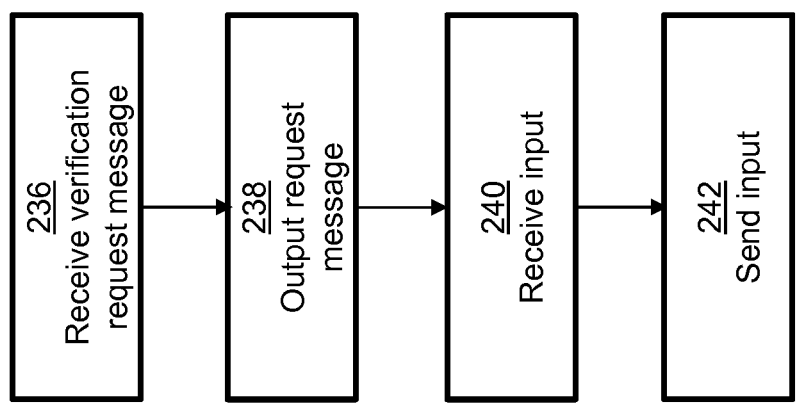
Figure 2E:
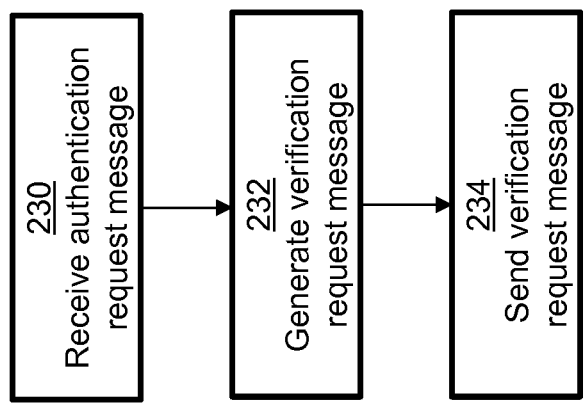
Figure 2I:
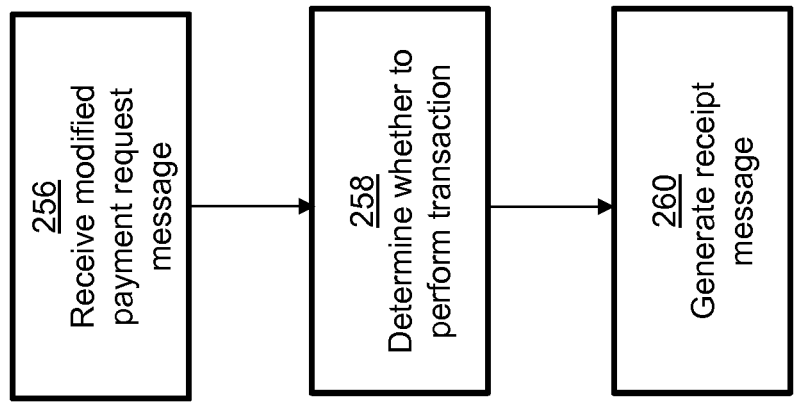

The operations of FIG. 2E are performed by the issuer server, as described above. The corresponding operations of the verification device will now be described with reference to FIG. 2F.

At operation 236, the verification request message is received at the verification device. In an embodiment, the verification request message is received as an SMS message. Alternatively, the verification request message may be received as an e-mail.

At operation 238, the verification device outputs the verification request in order to request the password data from a user of the verification device. In an embodiment, the verification device includes a display and the verification device may be configured to visually present a password request message for the password data on the display. In an embodiment, the verification device includes a speaker and the verification device may be configured to audibly present a request for the password data via the speaker.

At operation 240, the verification device receives an input from a user of the verification device. The verification device may be configured to receive the input from a user of the verification in response to outputting the verification request message. In an embodiment, the input may be entered using an input device of the verification device. In an embodiment, the input device is a keyboard, a keypad or a touch screen.

In an embodiment, the input may be a software or security token. Such tokens are used in addition to or in place of a password to prove that the user is who they claim to be, i.e. in this case the holder of the account. In an embodiment, the token may be generated by a separate physical token device and input to the verification device by the user. In another embodiment, the verification device may be the token device and may generate the token itself. In any case, the verification device receives the token as the input.

At operation 242, the verification device sends the input to the issuer server. In an embodiment, the verification device forwards the received input to the issuer server without processing the input. In another embodiment, the verification device may perform further processing to the input, for example by changing the format of the input, before the input is sent to the issuer server.

The operations of FIG. 2F are performed by the verification device, as described above. The corresponding operations of the issuer server will now be described with reference to FIG. 2G.

At operation 244, the issuer server receives the input. In this manner, the issuer is informed of the input entered by the user of the verification device.

At operation 246, the issuer server generates an authentication response message. The issuer server may generate the authentication response message in response to receiving the input.

In an embodiment, a password stored as verification data may be preset or registered by the holder of the account with the issuer. The password corresponding to the account may be stored in the database which is part of, or is in communication with, the issuer server.

Upon receiving the input at operation 244, the issuer server is further configured to compare the input received at operation 246 with the password identified in the verification data. In other words, the issuer server may determine that the holder of the account is the customer if the input received from the verification device matches or corresponds to the password identified by the verification data. For example, the verification request message may request that a complete password be entered. If so, the input is then compared by the issuer server to the complete preset or registered password. On the other hand, the verification request message may request that the first, third and sixth characters of the password be input. In this case, the input is then compared by the issuer server to the appropriate portions of the preset or registered password. In another embodiment, where the input includes a software or security token, cryptography techniques may be used to determine if the holder of the account is the customer. For example, the cryptography techniques can be used to determine if the token in the input was generated by a valid token generator. In an embodiment, an indication based on the determination of whether or not the holder of the account is the customer is included in the authentication response message. The indication is used to indicate whether the holder of the account is the customer.

For example, the indication may be "Y" or "Yes" if the input matches or corresponds to the password identified in the verification data. The indication may be "N" or "No" if the input does not match or correspond to the password identified in the verification data. The indication may be "U" or "Un-contactable" if no input has been received at the verification device.

In an embodiment, the issuer server may authenticate the indication by including a certificate in the authentication request message. In an embodiment, the certificate may be a signature belonging to the issuer server. The certificate may be used to confirm that the indication is provided by the issuer. In this way, a recipient of the certificate provided in the authentication request message may be informed that the indication is rightfully included by the issuer via the certificate, i.e. that the indication is authentic.

In an embodiment, the authentication request message includes the indication. In another embodiment, the authentication request message includes the indication and the certificate.

At operation 248, the issuer server sends the authentication response message to the payment network server. In other words, the issuer sends the authentication response message to inform the payment network server if the holder of the account is likely to have initiated the transaction.

Figure 2H:
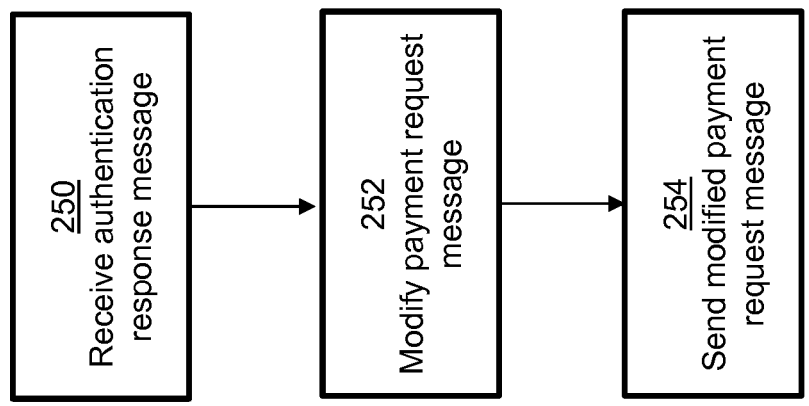
Figure 2G:
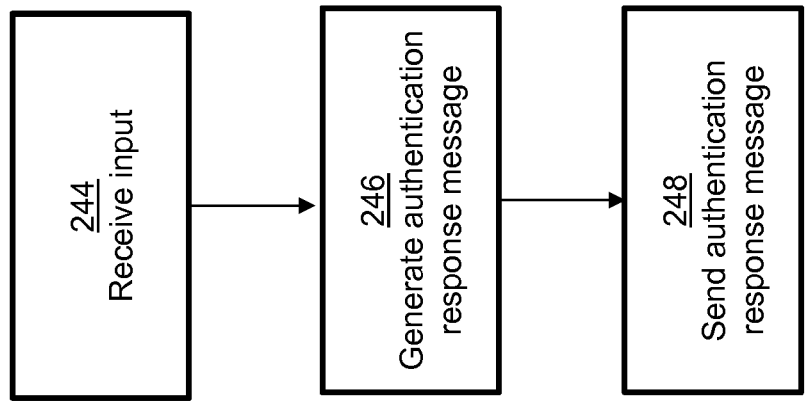

The operations of FIG. 2G are performed by the issuer server, as described above. The corresponding operations of the payment network server will now be described with reference to FIG. 2H.

At operation 250, the payment network server receives the authentication response message. In other words, the payment network server is informed if the customer is likely to be the holder of the account.

At operation 252, the payment network server modifies the payment request message to form a modified payment request message. In an embodiment, the modified payment request message includes the original payment request message and the indication in the authentication response message. Additionally, the modified payment request message may include the original payment request message together with the indication and the certificate in the authentication response message. In an embodiment, the original payment request message corresponds to the payment request message received in operation 214 which may also be the payment request message held in operation 224. After the modified payment request message has been generated, the payment network server may be free to stop holding or delete the payment request message. In an embodiment, the payment network server may also continue to hold the payment request message after the modified payment request message has been generated.

At operation 254, the payment network server sends the modified payment request message to the issuer server. In this way, the payment network server informs the issuer about the payment request generated by the merchant and the indication which indicates if the customer who initiated the transaction with the merchant is the holder of the account.

The operations of FIG. 2H are performed by the payment network server, as described above. The corresponding operations of the issuer server will now be described with reference to FIG. 2I.

At operation 256, the issuer server receives the modified payment request message from the payment network server.

At operation 258, the issuer server determines whether to authorize the transaction. In an embodiment, the issuer server may authorize the transaction if the modified payment request message indicates that the holder of the account is the customer, e.g. the indication is "Y". In an embodiment, the issuer server may not authorize the transaction if the modified payment request message does not indicate that the holder of the account is the customer, e.g. the indication is "N" or "U".

However, in another embodiment, the issuer server may also authorize the transaction if the modified payment request message does not indicate that the holder of the account is the customer, e.g. the indication is "N" or "U". For example, the issuer server may determine the type of the account (based on the account data) if the modified payment request message does not indicate that the holder of the account is the customer. For example, if the account is a privileged type, the issuer may proceed to authorize the transaction at its own discretion if the input received at the verification device does not correspond to the password identified in the verification data (i.e. the indicator is "No" or "Un-contactable"). On the other hand, if the account is not a privileged type, the issuer server may not proceed to authorize the transaction. The issuer server may credit an amount equivalent to the value or price of the good and/or service to the account belonging to the merchant (or merchant account) to authorize the transaction.

At operation 260, the issuer server generates a receipt message. The receipt message indicates whether or not the transaction has been authorized. The receipt message may be sent to the payment network server to inform the payment network server whether or not the transaction has been authorized. By way of example, the transaction is considered to be authorized when the holder account is in good standing (e.g. no outstanding bills and/or poor credit history) and an amount equivalent to the total value of the good and/or service is available in the holder's account balance or holder's account "open to buy" limit (credit account).

In an embodiment, the receipt message may be forwarded from the payment network server to the merchant device via the acquirer server to inform the merchant whether or not the transaction was performed. The receipt message may also be sent to from the merchant device to the customer device to inform the customer whether or not the transaction was performed.

In view of the above, if the conditions used by the payment network server are not met, the original payment request message is sent to the issuer server as per the normal operation flow. On the other hand, if the conditions used by the payment network server are met, the original payment request message is held by the payment network server and an authentication request message is generated by the payment network server and sent to the issuer server. When the result of authentication is received by the payment network server, it generates a modified payment request message which includes an indication of whether or not the customer is likely to be the true account holder. In this way, if the conditions are not met, the normal operation flow is not impeded. However, if the conditions are met, an additional authentication procedure is initiated and controlled by the payment network server. In this way, authentication is improved by the payment network server.

The system and operations of the first embodiment are described above. The system and operations of a second embodiment will now be described below.

The system of the second embodiment includes elements that may be utilized to perform a process for authentication for a customer. The elements of the second embodiment may be identical to elements 10, 12, 14, 16, 18 and 20 of FIG. 1. Accordingly, a customer device is configured to communicate with a merchant device. The merchant device is configured to communicate with an acquirer server. The acquirer server is configured to communicate with a payment network server. The payment network server is configured to communicate with an issuer server. The issuer server is configured to communicate with a verification device.

In the second embodiment, the acquirer server is configured to perform the operations of the payment network server as illustrated in FIGS. 2D and 2H. For example, the acquirer server is configured to receive a payment request message. The acquirer server is also configured to generate an authentication request message and/or hold the payment request message based on one or more conditions. The one or more conditions include determining (i) if the merchant is subscribed to the service, (ii) if the type of transaction is a predetermined type and/or (iii) if the holder is subscribed to the service. When an authentication request message is generated, the acquirer server is configured to send the generated authentication request message to the issuer server via the payment network server. The acquirer server may be further configured to forward the payment request message to the issuer server via the payment network server if the one or more conditions are not met. Accordingly, the acquirer server is configured to perform operations 214, 216, 218, 220, 222, 224, 226 and 228 of FIG. 2D.

Additionally, the acquirer server is configured to receive an authentication request message from the issuer server via the payment network server. The acquirer server is configured to generate a modified payment request message and send the modified payment request message to the issuer server via the payment network server. Accordingly, the acquirer server is configured to perform operations 250, 252 and 254 of FIG. 2H.

In the second embodiment, the payment network server is configured to perform the role of the acquirer server of FIG. 2, for example, to exchange messages with and pass information to another server, either the issuer server or the acquirer server. Accordingly, the payment network server may be configured to forward an authentication request message from the acquirer server to the issuer server. Further, the payment network server may also be configured to forward an authentication response message from the issuer server to the acquirer server and a modified payment request message from the acquirer server to the issuer server.

In summary, in the second embodiment, the acquirer server performs the operations of the payment network server of the first embodiment and the payment network server just forwards messages between the acquirer server and the issuer server.

The system and operations of the second embodiment are described above.

With respect to the first and second embodiments, a proxy server may be defined. The proxy server may be a general term to refer to a server which performs the operations of the payment network server of the first embodiment or the acquirer server of the second embodiment.

In an embodiment, the proxy server is configured to receive a payment request message including merchant data. The proxy server determines if the merchant is subscribed to an authentication service based on the merchant data. If it is determined that the merchant is not subscribed to the service, the proxy server generates an authentication request message which requests confirmation that a holder of the account is the customer, i.e. that they are the ones initiating the transaction. The proxy server is further configured to send the authentication request message to an external server (e.g. the issuer server or, perhaps, the issuer server via the payment network server. Additionally, the proxy server is configured to receive an authentication response message from the external server in response to sending the authentication request message, the authentication response message comprising an indication of whether the holder is the customer. The authentication response message may be received from the issuer server or, perhaps, from the issuer server via the payment network server.

In an embodiment, the proxy server may be further configured to hold the payment request message and generate the authentication request message based on one or more conditions being met. The one or more conditions were described in more details in operations 216, 218 and 220. The proxy server may be further configured to forward the payment request message if the one or more conditions are not met.

As stated above, the first and second embodiments may be utilized to implement an authentication method which confirms if a holder of an account is the customer who is initiating the account.

The system and operations of a third embodiment will now be described. FIG. 3 illustrates a system 700 in accordance with the third embodiment. The system 700 illustrates elements that may be utilized to perform an authentication process relating to a transaction between a customer and a merchant. The system 700 includes a customer device 702 in communication with a merchant device 704. The merchant device 704 is in communication with an acquirer server 706. The acquirer server 706 is in communication with a BankNet/MDS 708. The BankNet/MDS 708 is in communication with a directory server 710. The directory server 710 is in communication with an issuer server 712. The issuer server 712 is in communication with a verification device 714.

The customer device 702 may be associated with the customer who is a party to the transaction. In an embodiment, the customer device 702 may be a computing device. In an embodiment, the customer device may be a handheld or portable or mobile device carried or used by the customer. Accordingly, the customer device 702 may be analogous to the customer device 10 of FIG. 1.

The merchant device 704 may be associated with the merchant who is also a party to the transaction. In an embodiment, the merchant device 704 may be a computing device. Accordingly, the merchant device 704 may be analogous to the merchant device 12 of FIG. 1.

The acquirer server 706 may be associated with an acquirer. The acquirer may be an entity which issues an account to the merchant. Accordingly, the acquirer server 706 may be analogous to the acquirer device 14 of FIG. 1.

The Banknet/MDS 708 is a computer server that facilitates the routing of payment card transactions between issuer servers and acquirer servers. The Banknet/MDS 708 stores the name of the holder (or owner) and the account data for each corresponding account. One such example is the Banknet owned by MasterCard®. Those skilled in the art will appreciate that other servers may also be used.

The directory server 710 may be used for processing messages. In an embodiment, the directory server 710 is configured to operate in the 3-D Secure™ Network service.

The issuer server 712 may be associated with an issuer. The issuer may be an entity which issues an account to the customer. Accordingly, the issuer server 712 may be analogous to the issuer server 18 of FIG. 1.

The verification device 714 may be a handheld or portable or mobile device carried or used by the holder of the account. Accordingly, the verification device 714 may be analogous to the verification device 20 of FIG. 1.

In an embodiment, the elements may be arranged based on a three-domain model, for example, the 3-D Secure™ Network domain model. The three domains are an issuer domain 720, an acquirer domain 722 and an interoperability (or interface) domain 724. In an embodiment, a "domain" is a group of computers and devices on a network that are administered as a unit with common rules and procedures.

The issuer domain 720 may be configured to facilitate verification of a holder of the account, for example, to verify if the holder of the account has initiated the transaction. The issuer domain 720 may be configured to facilitate communication or exchange of information among the customer, the issuer and the holder of the account. For example, the issuer server 712 may be configured to communicate with the verification device 714 via the issuer domain 720. The customer device 702 may be configured to send a transaction request message in the issuer domain 720.

In an embodiment, the issuer domain may include a browser accessible by the customer, and customer software. The browser acts as a conduit to transport messages between the acquirer domain and the issuer domain. The customer software relates to the customer and may be used to support implementation of the account. Further, the issuer domain may include an enrollment server which registers a customer device to a service. Additionally, the issuer domain may include an access control server to verify whether the account is subscribed to a service. The issuer domain may also further include software for validating a security code, such as an accountholder authentication value.

The acquirer domain 722 may be configured to facilitate communication or exchange of information between the merchant and the acquirer. For example, the merchant device 704 may be configured to communicate with the acquirer server 706 in the acquirer domain 722.

In an embodiment, the acquirer domain may include plug-in software for authorization. The merchant may be allowed to use the plug-in software if the merchant is a subscriber of a service such as a 3-D Secure Network Service. The acquirer domain may further include a computer or a network of computers for validating a party, e.g. validating a merchant using a digital signature.

The interoperability domain 724 may be configured to facilitate transaction or message exchange between the issuer domain 720 and the acquirer domain 722. For example, the acquirer server 706 may be configured to communicate with the issuer domain 712 via the interoperability domain 724. In an embodiment, the issuer domain 720 and the acquirer domain 722 are only able to communicate with each other in the interoperability domain 724.

In an embodiment, the interoperability domain may include a directory server. The directory server may be configured to facilitate authorization process by merchants who are subscribed to a service. The interoperability domain may include a computer or a network of computers for distributing certificates such as MasterCard® Root certificate or Issuer Digital Signing certificates.

FIGS. 4A-4M show flow diagrams of a method performed by the above-described elements of FIG. 3 in accordance with the third embodiment. The following describes FIGS. 4A-4M in turn.

Figure 4A:
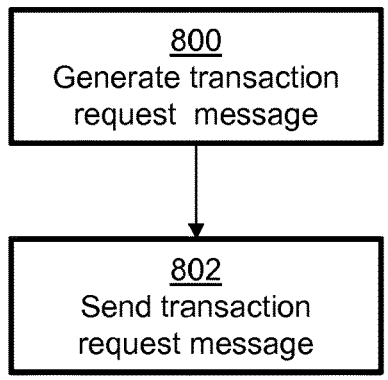
FIGS. 4A-4M are each a flow diagram of a method in accordance with the third embodiment of FIG. 3.

The operations of FIG. 4A are performed by the customer device. At operation 800, the customer device generates a transaction request message. At operation 802, the customer device sends the transaction request message to the merchant device. Accordingly, operations 800 and 802 of FIG. 4A may be analogous to operations 200 and 202 of FIG. 2A.

Figure 4B:
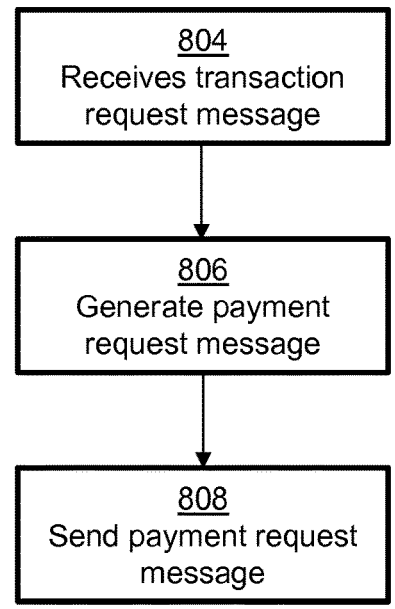

The operations of FIG. 4B are performed by the merchant device. At operation 804, the merchant device receives the transaction request message. At operation 806, the merchant device generates a payment request message and, at operation 808, the merchant device sends the payment request message to the acquirer server. Accordingly, operations 804, 806 and 808 of FIG. 8B may be analogous to operations 204, 206 and 208 of FIG. 2B.

Figure 4C:
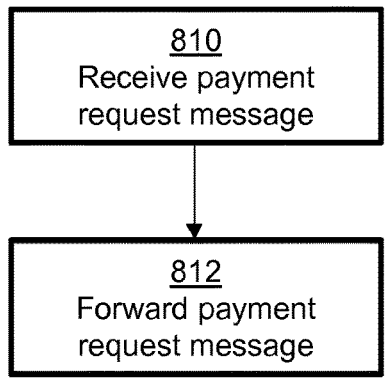

The operations of FIG. 4C are performed by the acquirer server. At operation 810, the acquirer server receives the payment request message. At operation 812 the payment request message is forwarded from the acquirer server to the Banknet/MDS. In an embodiment, the acquirer server forwards the payment request message as a 0100/0200 message which includes the account data and the transaction data from the transaction request message. The transaction data from the transaction request message serves to inform the acquirer of the value of the good and/or service to be transacted. In an embodiment, the 0100/0200 message complies with International Standards.

In an embodiment, there is a preset time duration for the acquirer server to receive a response message from the Banknet/MDS in response to sending the payment request message. In the event that the acquirer server does not receive the response message from the Banknet/MDS within the preset time duration, the acquirer server is configured to resend the payment request message to the Banknet/MDS. In an embodiment, the preset time duration is 20, 50 or 100 seconds.

Figure 4D:
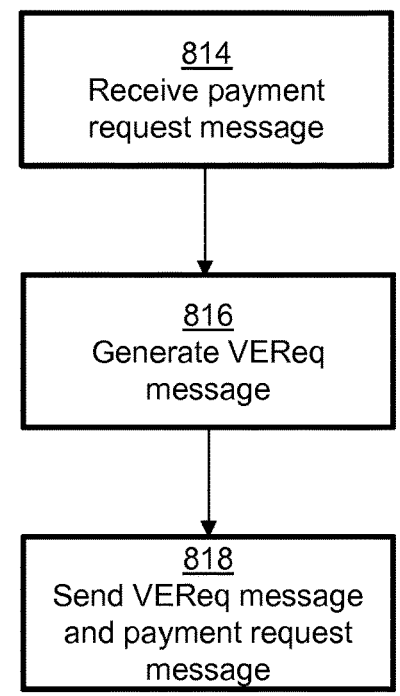

The operation of FIG. 4D is performed by the Banknet/MDS. At operation 814, the Banknet/MDS receives the payment request message from the acquirer server. At operation 816, the Banknet/MDS generates a verifying enrolment request (or VEReq) message based on the payment request message. In an embodiment, the VEReq message may include the PAN of the account and the merchant data both of which may be included in the payment request message. Additionally or alternatively, the VEReq message may include a verifying request message requesting that the account holder be verified to determine whether or not the customer is the holder. The verifying request message includes a time duration that the verification of the holder should be done within. In an embodiment, the time duration is 120 seconds.

At operation 818, the VEReq message and the payment request message are sent from the Banknet/MDS to the directory server. In an embodiment, the VEReq message and the payment request message are sent as two different messages.

The operation of the directory server will now be described with reference to FIG. 4E.

At operation 820, the VEReq message and the payment request message are received at the directory server. In an embodiment, the VEReq message and the payment request message are received as separate messages.

Figure 4E:
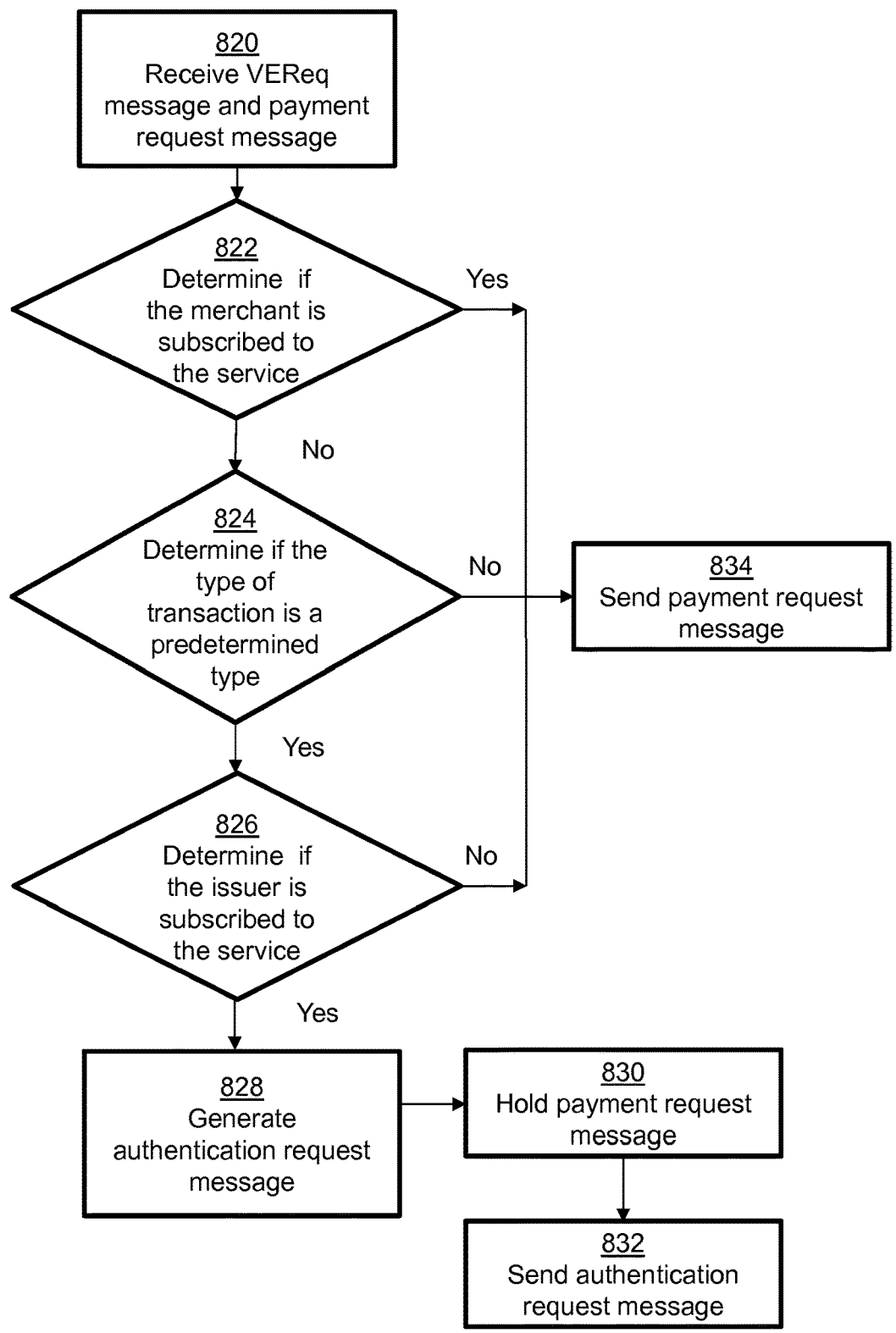

In an embodiment, operations 822, 824, 826, 830, 832 and 834 of FIG. 4E are identical to operations 216, 218, 220, 224, 226 and 228 of FIG. 2D, respectively. Processing flows from operation 832 to operation 836 of FIG. 4F after an authentication request message is generated.

In an embodiment, operation 828 may be analogous to operation to 222 of FIG. 2D. At operation 828, the directory server sends the authentication request message to the issuer server. Additionally, the directory server sends the authentication request message together with information relating to the issuer server. In this way, the directory server identifies itself to the issuer server via the information. In an embodiment, the information relates to information conforming to Secure Sockets Layer (SSL) or Transport Layer Security (TLS) protocol. In an embodiment, the information relates to a public key certificate.

The operations of the issuer server will now be described with reference to FIG. 4F.

At operation 836, the issuer server receives the authentication request message. In an embodiment, the issuer server may receive the authentication request message only if the directory server is identified via the information. In another embodiment, the issuer server may receive the authentication request message in all instances. Accordingly, operation 836 may be analogous to operation to 230 of FIG. 2E.

At operation 838, the issuer server generates a notification message. In an embodiment, the issuer server may compare the account data in the authentication request message and the data corresponding to the account in the database to determine if the holder of the account has previously indicated its willingness to do verification (e.g. via a pre-registration process). The data which corresponds to the account may indicate a holder's preference on whether he is willing to do verification with respect to a transaction.

In an embodiment, the issuer server may also confirm if a holder of the account is a subscriber to the service by comparing the account data in the payment request message and the data corresponding to the account in the database. The notification message may include confirmation confirming whether the holder of the account is a subscriber to an authentication service, e.g. the 3-D Secure™ Network service.

In an embodiment, the authentication process may only proceed if the issuer consents to forward the verification request message. In an embodiment, the issuer server may also include a consent indication into the notification message. The consent indication serves to inform whether or not the issuer consents to forward a verification request message to a verification device. For example, the issuer server may not consent to facilitate the verification process for a certain type of account identified by the PAN in the account data.

At operation 840, the issuer server may generate a verifying enrolment response (VERes) message. The VERes message may include the notification message from the issuer server. In an embodiment, the issuer server may only generate a VERes message if the issuer server consents to forward the verification request message to a verification device. In an embodiment, the issuer server generates the VERes message in all instances.

At operation 842, the issuer server sends the VERes message and the notification message to the directory server. In an embodiment, the VERes and the notification message are sent in a single message. Alternatively, the VERes message and the notification message are sent in separate messages. The notification message serves to notify the directory server whether or not the holder of the account will be doing a verification.

The operations of the directory server will now be described with reference to FIG. 4G.

At operation 844, the directory server receives the VERes message and the notification message.

At operation 846, the directory server sends the VERes message to the Banknet/MDS. In an embodiment, the directory server sends the VERes message and the notification message to the Banknet/MDS.

Figure 4H:
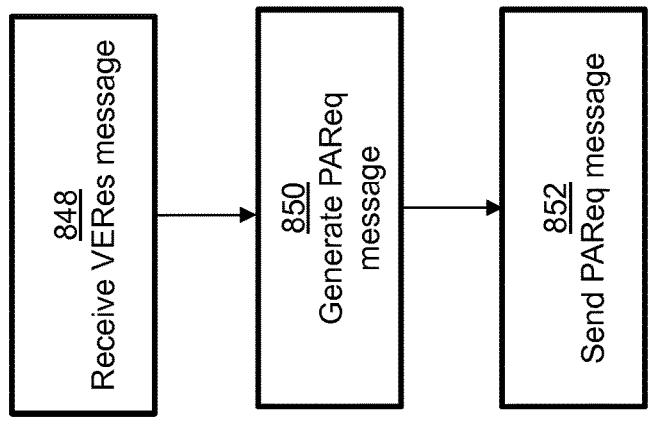
Figure 4G:
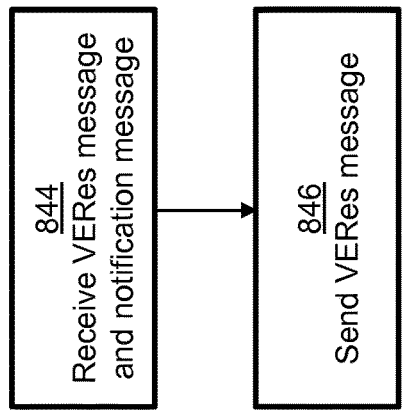
Figure 4F:
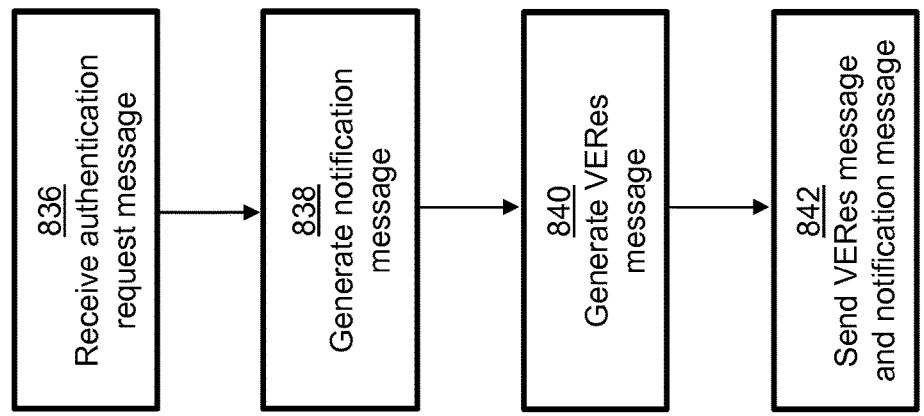

The operations of FIG. 4H are performed by the Banknet/MDS.

At operation 848, the Banknet/MDS receives the VERes message from the directory server. In an embodiment, the Banknet/MDS forwards the VERes message to the issuer server.

At operation 850, the Banknet/MDS creates a Payer Authentication Request (or PAReq) message which includes the transaction data from the payment request message received at operation 814.

At operation 852, the Banknet/MDS sends the PAReq message to the issuer sever via the directory server.

In an existing 3-D Secure™ Network service, a PAReq message is generated and sent by a computer server to another computer server to establish an authentication session. As such, in an embodiment, operations 832 and 834 may be performed to be consistent with an existing service, such as the 3-D Secure™ Network service.

Figure 4J:
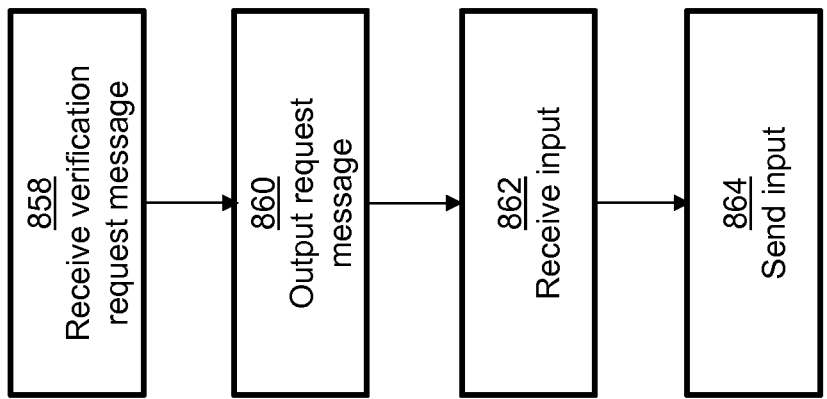
Figure 4I:
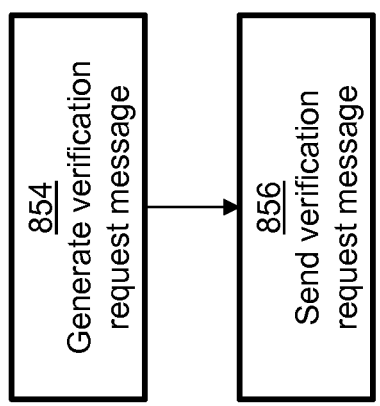

The operations of FIG. 4I are performed by the issuer server.

At operation 854, the issuer server generates the verification request message. In an embodiment, the verification request message may be generated at the same time as sending the notification message in operation 840. In another embodiment, the verification request message may be generated after the notification message is generated in operation 840. In an embodiment, the verification request message may be generated only in response to the PAReq message. In this case, the issuer server may be sent the PAReq by the directory server. In another embodiment, the verification request message may be generated without generating the PAReq message.

At operation 856, the issuer server sends the verification request message to the verification device. Accordingly, operation 854 may be analogous to operation 234 of FIG. 2E.

The operations of FIG. 4J are performed by the verification device.

The verification device may be configured to receive the verification request message. The verification device may also be configured to output the request message. The verification device may also be configured to receive an input and send the input to the issuer server. Accordingly, operations 858, 860, 862 and 864 of FIG. 4J may be identical to operations 236, 238, 240 and 242 of FIG. 2F.

Figure 4M:
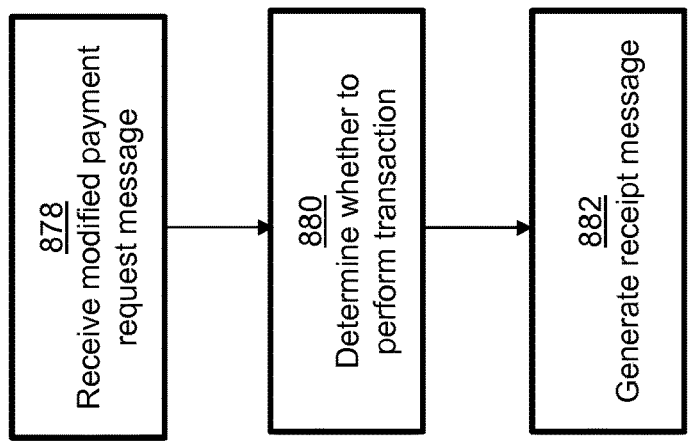
Figure 4L:
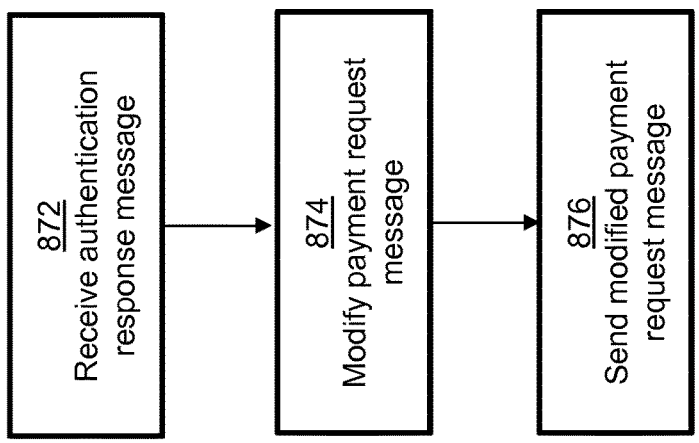
Figure 4K:
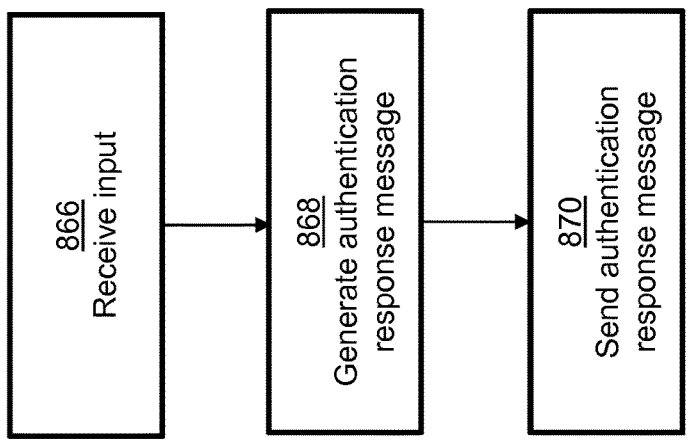

The operations of FIG. 4K are performed by the issuer server.

At operation 866, the issuer server receives the input. Accordingly, operation 866 of FIG. 4K may be identical to operation 244 FIG. 2G.

At operation 868, the issuer server generates an authentication response message.

In an embodiment, the authentication response message may include a payment authentication response (PARes) message which may be used to indicate whether the holder of the account is the customer. In an embodiment, operation 868 may be analogous to operation 246 of FIG. 2G. For example, the PARes may be obtained in a manner similar to the indication of operation 246, i.e. based on a comparison between the input received by the verification device and a password associated with the account and stored by the issuer server.

At operation 870, the issuer server sends the authentication response message to the Banknet/MDS via the directory server. In an embodiment, the authentication response message includes the PARes message.

The operations of FIG. 4L are performed by the Banknet/MDS.

The Banknet/MDS receives the authentication response message from the issuer server. The Banknet/MDS modifies the original payment request message to generate a modified payment request message. Subsequently, the Banknet/MDS sends the modified payment request message to the issuer server. Accordingly, operations 872, 874 and 876 of FIG. 4L may be analogous to operations 250, 252 and 254 of FIG. 2I.

The operations of FIG. 4M are performed by the issuer server.

The issuer server receives the modified payment request message from the Banknet/MDS. The issuer server determines whether to authorize the transaction. Additionally, the issuer server generates a receipt message to indicate if the transaction has been performed. Accordingly, operations 878, 880 and 882 of FIG. 4M may be identical to operations 256, 258 and 260 of FIG. 2H.

The system and operations of the third embodiment are described above. The system and operations of a fourth embodiment will now be described.

FIG. 5 illustrates a system 900 in accordance with the fourth embodiment. The system 900 illustrates elements that may be utilized to perform a process for authentication of a customer. Elements 902, 904, 908, 910, 912 and 914 may be identical to elements 702, 704, 708, 710, 712 and 714 of FIG. 7. In other words, FIG. 5 is the same as FIG. 3 but with the following exceptions.

The acquirer server 906 is in communication with a Banknet/MDS 908. In an embodiment, the acquirer server 906 may also be in communication with a directory server 910. In other words, the acquirer server is configured to exchange message with both the Banknet/MDS 908 and the directory server 910. Additionally, the Banknet/MDS 908 may not communicate directly with the directory server 910.

In the fourth embodiment, the acquirer server is configured to perform the operations of the Banknet/MDS as illustrated in FIGS. 4D and 4H. For example, the acquirer server is configured to receive a payment request message. Additionally, the acquirer server is configured to generate a verifying enrolment request (or VEReq) message. The acquirer server is also configured to send the VEReq message and the payment request message to the Banknet/MDS. Accordingly, the acquirer server is configured to perform operations 814, 816 and 818 of FIG. 4D.

Similarly, the acquirer server is configured to create a payer authentication request (or PAReq) message which includes the transaction data in the payment request message. Subsequently, the acquirer server is configured to send the PAReq message to the directory server. Accordingly, the acquirer server is configured to perform operations 848 and 850 of FIG. 4H.

Further, the acquirer server is also configured to perform the operations of the directory server as illustrated in FIG. 4E. For example, the acquirer server is configured to hold the payment request or generate an authentication request message based on one or more conditions. The one or more conditions include determining (i) if the merchant is subscribed to the service, (ii) if the type of transaction is a predetermined type and/or (iii) if the holder is subscribed to the service. The acquirer server may be further configured to forward the payment request message if the one or more conditions are not met. Accordingly, the acquirer server is configured to perform steps 822, 824, 826, 828, 830, 832 and 834 of FIG. 4E.

In the fourth embodiment, the acquirer server is also configured to generate an authorization request which includes a request to complete the transaction. The authorization request may be sent from the acquirer server to the issuer server after the acquirer server receives the authentication response message. In an embodiment, the authorization request is sent to the issuer server via the Banknet/MDS. In an embodiment, the communication between the acquirer server and the payment network server conforms to the international standards ISO 8583.

With respect to the third and fourth embodiments, a payment network server may be included. In an embodiment, the payment network server may include only the Banknet/MDS. In another embodiment, the payment network server may include only the directory server. In a further embodiment, the payment network server may include the Banknet/MDS and the directory server.

Figure 6:
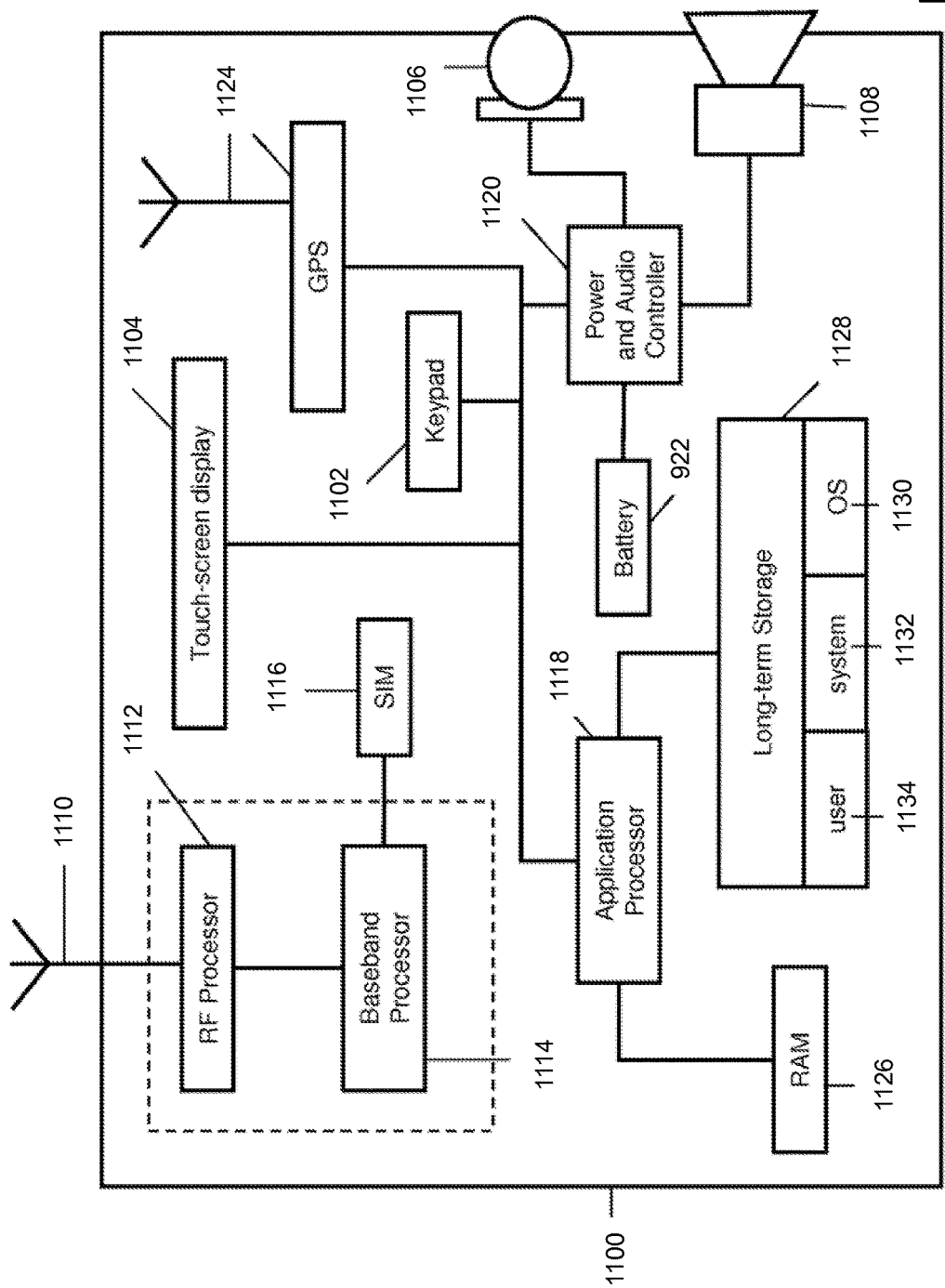
FIG. 6 is a schematic diagram of a wireless device in accordance with a further embodiment.

FIG. 6 is a schematic of an example wireless computing device 1100 that may be utilized to implement the customer device, the merchant device and/or the verification device in accordance with an embodiment.

The wireless device 1100 includes a keypad 1102, a touch-screen 1104, a microphone 1106, a speaker 1108 and an antenna 1110. The wireless device 1100 is capable of being operated by a user to perform a variety of different functions, such as, for example, hosting a telephone call, sending an SMS message, browsing the Internet, sending an email and providing satellite navigation.

The wireless device 1100 includes hardware to perform communication functions (e.g. telephony, data communication), together with an application processor and corresponding support hardware to enable the wireless device 1100 to have other functions, such as, messaging, Internet browsing, email functions and the like. The communication hardware is represented by the RF processor 1112 which provides an RF signal to the antenna 1110 for the transmission of data signals, and the receipt therefrom. Additionally provided is a baseband processor 1114, which provides signals to and receives signals from the RF Processor 1112. The baseband processor 1114 also interacts with a subscriber identity module 1116, as is well known in the art. The communication subsystem enables the wireless device 1100 to communicate via a number of different communication protocols including 3G, 4G, GSM, WiFi, Bluetooth™ and/or CDMA.

The keypad 1102 and the touch-screen 1104 are controlled by an application processor 1118. A power and audio controller 1120 is provided to supply power from a battery 1122 to the communication subsystem, the application processor 1118, and the other hardware. The power and audio controller 1120 also controls input from the microphone 1106, and audio output via the speaker 1108. Also provided is a global positioning system (GPS) antenna and associated receiver element 1124 which is controlled by the application processor 1118 and is capable of receiving a GPS signal for use with a satellite navigation functionality of the wireless device 1100.

In order for the application processor 1118 to operate, various different types of memory are provided. Firstly, the wireless device 1100 includes Random Access Memory (RAM) 1126 connected to the application processor 1118 into which data and program code can be written and read from at will. Code placed anywhere in RAM 1126 can be executed by the application processor 1118 from the RAM 1126. RAM 1126 represents a volatile memory of the wireless device 1100.

Secondly, the wireless device 1100 is provided with a long-term storage 1128 connected to the application processor 1118. The long-term storage 1128 includes three partitions, an operating system (OS) partition 930, a system partition 1132 and a user partition 1134 The long-term storage 1128 represents a non-volatile memory of the wireless device 1100.

In the present example, the OS partition 1130 contains the firmware of the wireless device 1100 which includes an operating system. Other computer programs may also be stored on the long-term storage 1128, such as application programs, and the like. In particular, application programs which are mandatory to the wireless device 1100, such as, in the case of a smartphone, communications applications and the like are typically stored in the system partition 1132. The application programs stored on the system partition 1132 would typically be those which are bundled with the wireless device 1100 by the device manufacturer when the wireless device 1100 is first sold.

Application programs which are added to the wireless device 1100 by the user would usually be stored in the user partition 1134.

As stated, the representation of FIG. 6 is schematic. In practice, the various functional components illustrated may be substituted into one and the same component. For example, the long-term storage 1128 may include NAND flash, NOR flash, a hard disk drive or a combination of these.

Figure 7:
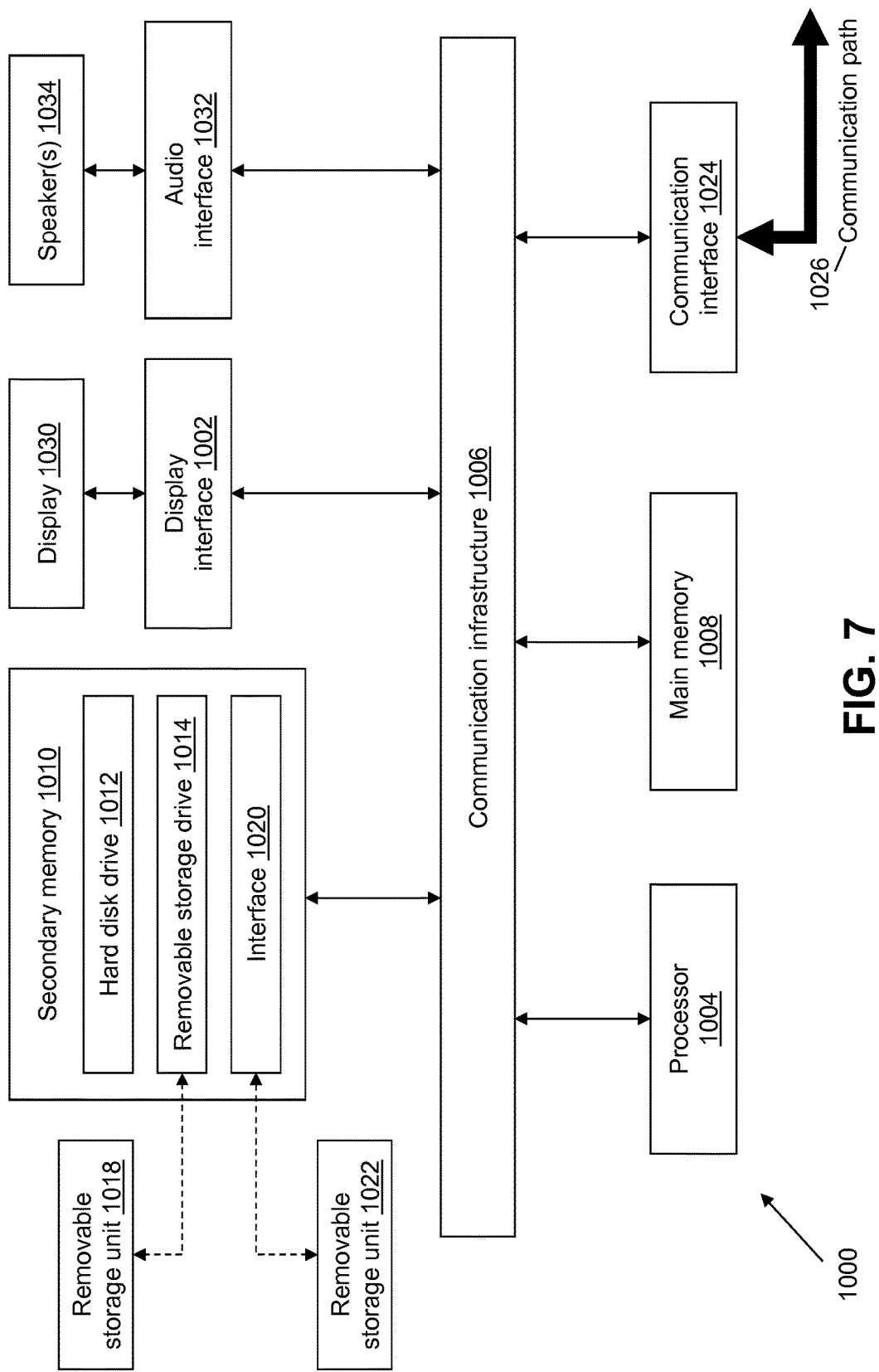
FIG. 7 is a schematic diagram of a computer system in accordance with another embodiment.

FIG. 7 depicts an example computing device 1000 that may be utilized to implement the customer device, the merchant device or the verification device in accordance with an embodiment. Additionally, the acquirer server, the payment network server, the proxy server or another server in accordance with an embodiment may be either the computing device 1000 or a plurality of interconnected computing devices 1000. The following description of the computing device 1000 is provided by way of example only and is not intended to be limiting.

As shown in FIG. 7, the example computing device 1000 includes a processor 1004 for executing software routines. Although a single processor is shown for the sake of clarity, the computing device 1000 may also include a multi-processor system. The processor 1004 is connected to a communication infrastructure 1006 for communication with other components of the computing device 1000. The communication infrastructure 1006 may include, for example, a communications bus, cross-bar, or network.

The computing device 1000 further includes a main memory 1008, such as a random access memory (RAM), and a secondary memory 1010. The secondary memory 1010 may include, for example, a hard disk drive 1012 and/or a removable storage drive 1014, which may include a floppy disk drive, a magnetic tape drive, an optical disk drive, or the like. The removable storage drive 1014 reads from and/or writes to a removable storage unit 1018 in a well-known manner. The removable storage unit 1018 may include a floppy disk, magnetic tape, optical disk, or the like, which is read by and written to by removable storage drive 1014. As will be appreciated by persons skilled in the relevant art(s), the removable storage unit 1018 includes a computer readable storage medium having stored therein computer executable program code instructions and/or data.

In an alternative implementation, the secondary memory 1010 may additionally or alternatively include other similar means for allowing computer programs or other instructions to be loaded into the computing device 1000. Such means can include, for example, a removable storage unit 1022 and an interface 1020. Examples of a removable storage unit 1022 and interface 1020 include a program cartridge and cartridge interface (such as that found in video game console devices), a removable memory chip (such as an EPROM or PROM) and associated socket, and other removable storage units 1022 and interfaces 1020 which allow software and data to be transferred from the removable storage unit 1022 to the computer system 1000.

The computing device 1000 also includes at least one communication interface 1024. The communication interface 1024 allows software and data to be transferred between computing device 1000 and external devices via a communication path 1026. In various embodiments, the communication interface 1024 permits data to be transferred between the computing device 1000 and a data communication network, such as a public data or private data communication network. The communication interface 1024 may be used to exchange data between different computing devices 1000 which such computing devices 1000 form part an interconnected computer network. Examples of a communication interface 1024 can include a modem, a network interface (such as an Ethernet card), a communication port, an antenna with associated circuitry and the like. The communication interface 1024 may be wired or may be wireless. Software and data transferred via the communication interface 1024 are in the form of signals which can be electronic, electromagnetic, optical or other signals capable of being received by communication interface 1024. These signals are provided to the communication interface via the communication path 1026.

As shown in FIG. 7, the computing device 1000 further includes a display interface 1002 which performs operations for rendering images to an associated display 1030 and an audio interface 1032 for performing operations for playing audio content via associated speaker(s) 1034.

As used herein, the term "computer program product" may refer, in part, to removable storage unit 1018, removable storage unit 1022, a hard disk installed in hard disk drive 1012, or a carrier wave carrying software over communication path 1026 (wireless link or cable) to communication interface 1024. A computer readable medium can include magnetic media, optical media, or other recordable media, or media that transmits a carrier wave or other signal. These computer program products are devices for providing software to the computing device 1000.

The computer programs (also called computer program code) are stored in main memory 1008 and/or secondary memory 1010. Computer programs can also be received via the communication interface 1024. Such computer programs, when executed, enable the computing device 1000 to perform one or more features of embodiments discussed herein. In various embodiments, the computer programs, when executed, enable the processor 1004 to perform features of the above-described embodiments. Accordingly, such computer programs represent controllers of the computer system 1000.

Software may be stored in a computer program product and loaded into the computing device 1000 using the removable storage drive 1014, the hard disk drive 1012, or the interface 1020. Alternatively, the computer program product may be downloaded to the computer system 1000 over the communications path 1026. The software, when executed by the processor 1004, causes the computing device 1000 to perform functions of embodiments described herein.

It is to be understood that the embodiment of FIG. 7 is presented merely by way of example. Therefore, in some embodiments one or more features of the computing device 1000 may be omitted. Also, in some embodiments, one or more features of the computing device 1000 may be combined together. Additionally, in some embodiments, one or more features of the computing device 1000 may be split into one or more component parts.

It will be appreciated that the elements illustrated in FIG. 7 function to provide means for performing the various functions and operations of the servers as described in the above embodiments. For example, considering the proxy server, the elements of FIG. 7 function to provide: means for receiving a payment request message, means for determining if the merchant is subscribed to the service, means for generating an authentication request message, means for sending the authentication request message to an external server, and means for receiving an authentication response message from the external server.

In an embodiment, the customer device, the merchant device, the verification device, the issuer server, the acquirer server, the payment network server, the proxy server or any other server in accordance with an embodiment may be generally described as a physical device comprising at least one processor and at least one memory including computer program code. The at least one memory and the computer program code are configured to, with the at least one processor, cause the physical device to perform the above-described operations of an embodiment.

It will be appreciated by a person skilled in the art that numerous variations and/or modifications may be made to one or more of the above-described embodiments without departing from the spirit or scope of the invention as broadly described in the appended claims. The above-described embodiments are, therefore, to be considered in all respects to be illustrative and not restrictive.

What is claimed is:

1. A method performed using a proxy server communicating between a first merchant computing device, a second merchant computing device, a first issuer computing device, and a second issuer computing device, the method comprising:

receiving a first payment request message at the proxy server from the first merchant computing device, the first payment request message comprising first customer data and first merchant data;

storing, by the proxy server, a first set of rules including
i) a merchant does have a subscription to an authentication service,
ii) a transaction is not an online transaction, and
iii) an issuer does not have a subscription to the authentication service;

determining from the first payment request message, at the proxy server, that at least one of the first set of rules is satisfied;

transmitting the payment request message from the proxy server to the first issuer computing device based on the determination that at least one of the first set of rules is satisfied;

receiving a second payment request message at the proxy server from the second merchant computing device, the second payment request message comprising second customer data and second merchant data, the second merchant data including a subscription flag;

storing, by the proxy server, a second set of rules including
i) a merchant does not have a subscription to the authentication service based on the merchant data,
i) a transaction is an online transaction, and
ii) an issuer does have a subscription to the authentication service;

determining from the second payment request message, at the proxy server, that the second set of rules are satisfied;

generating an authentication request message at the proxy server based on the determination that the second set of rules are satisfied;

holding the second payment request message at the proxy server based on the generation of the authentication request message;

sending the authentication request message from the proxy server to the second issuer computing device while the second payment request message is held at the proxy server;

receiving an authentication response message from the second issuer computing device at the proxy server in response to sending the authentication request message, the authentication response message comprising an indication of whether a holder of an account is the second customer and an issuer certificate;

generating, by the proxy server, a modified payment request message by including in the held second payment request message, the issuer certificate and the indication of whether the holder of the account is the second customer; and transmitting the modified payment request message from the proxy server to the second issuer computing device.

2. The method according to claim 1, wherein the second customer data indicates that the holder of the account has a subscription to the authentication service.

3. The method according to claim 1, further comprising:
generating a transaction request message at a customer device, the transaction request message comprising the second customer data;
sending the transaction request message from the customer device to the second merchant computing device; and
generating the second payment request message at the second merchant computing device based on the transaction request message and sending the second payment request message from the second merchant computing device to the proxy server.

4. The method according to claim 1, the method further comprising:
generating a verification request message at the second issuer computing device based on verification data stored in association with the second customer data by the second issuer computing device, the verification data identifying a verification device of the holder of the account, the verification request message requesting password data for verification;
sending the verification request message from the second issuer computing device to the verification device and outputting a password request message for the password data from the verification device to a user of the verification device;
receiving an input at the verification device from the user of the verification device and sending the input from the verification device to the second issuer computing device; and
determining that the input matches a password identified in the verification data;
based on the determination that the input matches the password, generating the authentication response message including the indication at the second issuer computing device; and
sending the authentication response message from the second issuer computing device to the proxy server.

5. The method according to claim 4, further comprising:
authorizing the transaction at the second issuer computing device based on the modified payment request message.

6. The method according to claim 5, further comprising generating a receipt message at the second issuer computing device, the receipt message indicating whether or not the transaction has been authorized.

7. The method according to claim 1, wherein the proxy server is an acquirer server associated with an acquirer, the acquirer being an administrator of a merchant account associated with the second merchant computing device.

8. The method according to claim 1, wherein the proxy server is a payment network server, wherein the payment network server is in communication with an acquirer server associated with an acquirer, and wherein the acquirer is an administrator of a merchant account associated with the second merchant computing device.

9. A proxy server communicating between a first merchant computing device, a second merchant computing device, a first issuer computing device, and a second issuer computing device, the proxy server comprising:
at least one processor; and
at least one memory including computer program code that when executed by the at least one processor, causes the at least one processor to perform the steps of:
receiving, at the proxy server, a first payment request message from the first merchant computing device, the first payment request message comprising first customer data and first merchant data,
storing, by the proxy server, a first set of rules including
i) a merchant does have a subscription to an authentication service,
ii) a transaction is not an online transaction, and
iii) an issuer does not have a subscription to the authentication service:
determining, at the proxy server, from the first payment request message that at least one of the first set of rules is satisfied;
transmitting the payment request message from the proxy server to the first issuer computing device based on the determination that at least one of the first set of rules is satisfied;
receiving, at the proxy server, a second payment request message from the second merchant computing device, the second payment request message comprising second customer data and second merchant data, the second merchant data including a subscription flag;
storing, by the proxy server, a second set of rules including
i) a merchant does not have a subscription to the authentication service based on the merchant data,
ii) a transaction is an online transaction, and
iii) an issuer does have a subscription to the authentication service;
determining, at the proxy server, from the second payment request message that the second set of rules are satisfied;
generating, by the proxy server, an authentication request message based on the determination that the second set of rules are satisfied;
holding the second payment request message at the proxy server based on the generation of the authentication request message;
sending the authentication request message from the proxy server to the second issuer computing device while the second payment request message is held at the proxy server;
receiving an authentication response message at the proxy server from the second issuer computing device in response to sending the authentication request message, the authentication response message comprising an indication of whether a holder of an account is the second customer and including an issuer certificate;
generating, by the proxy server, a modified payment request message by including in the held second payment request message, the issuer certificate and the indication of whether the holder of the account is the second customer; and
transmitting the modified payment request message from the proxy server to the second issuer computing device.

10. The proxy server according to claim 9, wherein the second customer data indicates that the holder of the account has a subscription to the authentication service.

11. A system comprising:
a proxy server communicating between a first merchant computing device, a second merchant computing device, a first issuer computing device, and a second issuer computing device, the proxy server comprising:

at least one processor; and at least one memory including computer program code that when executed by the at least one processor, causes the at least one processor to perform the steps of:

receiving, at the proxy server, a first payment request message from the first merchant computing device, the first payment request message comprising first customer data and first merchant data;

storing, by the proxy server, a first set of rules including
  i) a merchant does have a subscription to an authentication service,
  ii) a transaction is not an online transaction, and
  iii) an issuer does not have a subscription to the authentication service:

determining, at the proxy server, from the first payment request message that at least one of the first set of rules is satisfied;

transmitting the payment request message from the proxy server to the first issuer computing device based on the determination that at least one of the first set of rules is satisfied;

receiving, at the proxy server, a second payment request message from the merchant computing device, the second payment request message comprising second customer data and second merchant data, the second merchant data including a subscription flag;

storing, by the proxy server, a second set of rules including
  i) a merchant does not have a subscription to the authentication service based on the merchant data,
  ii) a transaction is an online transaction, and
  iii) an issuer does have a subscription to the authentication service;

determining, at the proxy server, from the second payment request message that the second set of rules are satisfied;

generating, by the proxy server, an authentication request message based on the determination that the second set of rules are satisfied;

holding the second payment request message at the proxy server based on the generation of the authentication request message;

sending the authentication request message to the second issuer computing device while the second payment request message is held at the proxy server;

receiving an authentication response message at the proxy server from the second issuer computing device in response to sending the authentication request message, the authentication response message comprising an indication of whether a holder of an account is the second customer and including an issuer certificate;

generating, by the proxy server, a modified payment request message by including in the held second payment request message, the issuer certificate and the indication of whether the holder of the account is the customer; and transmitting the modified payment request message from the proxy server to the second issuer computing device; and a customer computing device associated with a customer, wherein the customer computing device comprises a customer computing device memory including computer program code that, when executed by a customer computing device processor, causes the customer computing device processor to perform the step of generating a transaction request message comprising the second customer data.

12. The system according to claim 11, further comprising:

the second merchant computing device associated with a merchant, wherein, when the computer program code included in the customer computing device memory is executed by the customer computing device processor, the computer program code included in the customer computing device memory causes the customer computing device processor to perform the step of sending the transaction request message to the second merchant computing device, and wherein the second merchant computing device comprises a second merchant computing device memory including computer program code that, when executed by a second merchant computing device processor, causes the second merchant computing device processor to perform the steps of:
  i) receiving the transaction request message from the customer computing device,
  ii) generating the second payment request message based on the transaction request message, and
  iii) sending the second payment request message to the proxy server.

13. The system according to claim 11, further comprising:

the second issuer computing device, wherein the second issuer computing device comprises a second issuer computing device memory including computer program code that, when executed by a second issuer computing device processor, causes the second issuer computing device processor to perform the steps of:

receiving the authentication request message from the proxy server, the authentication request message further comprising the second customer data from the second payment request message;

storing verification data in association with the second customer data; and generating a verification request message based on the verification data, the verification request requesting password data for verification.

14. Non-transitory computer-readable storage media having computer-executable instructions embodied thereon, the computer-executable instructions executable by at least one processor of a proxy server, the proxy server communicating between a first merchant computing device, a second merchant computing device, a first issuer computing device, and a second issuer computing device, wherein, when executed by the at least one processor, the computer-executable instructions cause the processor to perform the steps of:

receiving, at the proxy server, a first payment request message from the first merchant computing device, the first payment request message comprising first customer data and first merchant data, storing, by the proxy server, a first set of rules including
  i) a merchant does have a subscription to an authentication service,
  ii) a transaction is not an online transaction, and
  iii) an issuer does not have a subscription to the authentication service:

determining, at the proxy server, from the first payment request message that at least one of the first set of rules is satisfied;

transmitting the payment request message from the proxy server to the first issuer computing device based on the determination that at least one of the first set of rules is satisfied;

receiving, at the proxy server, a second payment request message from the second merchant computing device, the second payment request message comprising second customer data and second merchant data, the second merchant data including a subscription flag;

storing, by the proxy server, a second set of rules including
  i) a merchant does not have a subscription to the authentication service based on the merchant data,
  ii) a transaction is an online transaction, and
  iii) an issuer does have a subscription to the authentication service;

determining, at the proxy server, from the second payment request message that the second set of rules are satisfied;

generating, by the proxy server, an authentication request message at the proxy server based on the determination that the second set of rules are satisfied;

holding the second payment request message at the proxy server based on the generation of the authentication request message;

sending the authentication request message to the second issuer computing device from the proxy server while the second payment request message is held at the proxy server;

receiving an authentication response message at the proxy server from the second issuer computing device in response to sending the authentication request message, the authentication response message comprising an indication of whether a holder of an account is the second customer and including an issuer certificate;

generating, by the proxy server, a modified payment request message by including in the second held payment request message, the issuer certificate and the indication of whether the holder of the account is the second customer; and transmitting the modified payment request message from the proxy server to the second issuer computing device.

* * * * *